US009123207B2

(12) United States Patent
Chim et al.

(10) Patent No.: US 9,123,207 B2
(45) Date of Patent: Sep. 1, 2015

(54) GAMING MACHINE WITH CHALLENGE FEATURE

(71) Applicant: Aristocrat Technologies Australia Pty Limited, North Ryde, NSW (AU)

(72) Inventors: Chi We Chim, Lane Cove (AU); William George Cormack, Lane Cove (AU)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/850,852

(22) Filed: Mar. 26, 2013

(65) Prior Publication Data

US 2013/0217470 A1 Aug. 22, 2013

Related U.S. Application Data

(63) Continuation of application No. 13/153,595, filed on Jun. 6, 2011, now Pat. No. 8,414,376, which is a continuation of application No. 11/336,691, filed on Jan. 18, 2006, now Pat. No. 8,182,325.

(30) Foreign Application Priority Data

Jan. 18, 2005 (AU) ................................ 2005900207

(51) Int. Cl.

*A63F 9/24* (2006.01)
*A63F 13/00* (2014.01)

(Continued)

(52) U.S. Cl.

CPC ........ *G07F 17/3267* (2013.01); *G07F 17/3244* (2013.01); *G07F 17/34* (2013.01)

(58) Field of Classification Search

CPC . G07F 17/32; G07F 17/3244; G07F 17/3258; G07F 17/326; G07F 17/3262; G07F 17/3267; G07F 17/34

USPC ...................................................... 463/16, 20

See application file for complete search history.

(56) References Cited

U.S. PATENT DOCUMENTS 5,997,400 A * 12/1999 Seelig et al. ...................... 463/6
6,203,430 B1 3/2001 Walker et al.

(Continued)

FOREIGN PATENT DOCUMENTS

AU 746082 B2 10/1999
AU 2006200201 8/2006

(Continued)

OTHER PUBLICATIONS

Gayle Mitchell, Bonus slots review, Casino City Times, Oct. 1, 2001.

(Continued)

*Primary Examiner* — Lawrence Galka

(74) *Attorney, Agent, or Firm* — McAndrews, Held & Malloy, Ltd.

(57) ABSTRACT

A gaming system (10, 100) implementing a base game and a feature game. A game controller (101) controls play of the game. The gaming system has at least one display (14, 106) and a player interface (107). The feature game comprises at least one series of game events, in which a plurality of symbols from at least one predetermined symbol set that includes at least first and second symbols, are randomly selected and displayed on the at least one display (14, 106). The feature game is a challenge feature and during play of the feature game, the game controller (101) maintains in computer memory (103) counters for said at least first and second symbols, varies the value of said counters on the occurrence of the at least first and second symbols and causes the at least one display to show a value of the counters. The values of the counters are evaluated against predetermined competitive criteria to determine the outcome of the series of game events.

28 Claims, 17 Drawing Sheets

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(56) References Cited

U.S. PATENT DOCUMENTS

| | | | | |
|---|---|---|---|---|
| 6,254,481 | B1 | 7/2001 | Jaffe | |
| 6,471,208 | B2 | 10/2002 | Yoseloff et al. | |
| 6,793,575 | B2 * | 9/2004 | Brown et al. | 463/6 |
| 7,121,942 | B2 * | 10/2006 | Baerlocher | 463/20 |
| 7,666,089 | B2 * | 2/2010 | Rodgers et al. | 463/25 |
| 2003/0027622 | A1 * | 2/2003 | Osawa | 463/20 |
| 2004/0121833 | A1 | 6/2004 | Mezen et al. | |
| 2005/0043082 | A1 * | 2/2005 | Peterson et al. | 463/20 |

FOREIGN PATENT DOCUMENTS

| | | | |
|---|---|---|---|
| EP | 1184822 | A2 | 3/2002 |
| EP | 1341135 | A2 | 9/2003 |
| JP | 10301475 | A | 11/1998 |
| JP | 200362181 | A | 3/2003 |
| JP | 2005152164 | A | 6/2005 |
| JP | 2005152167 | A | 6/2005 |

OTHER PUBLICATIONS

Third Party Submission in Published Application under 37 C.F.R. 1.99, Marvin A. Motsenbocker, Nov. 29, 2011, pp. 1-11.

Examiner's first report on a related Australian application dated Oct. 25, 2010.

* cited by examiner

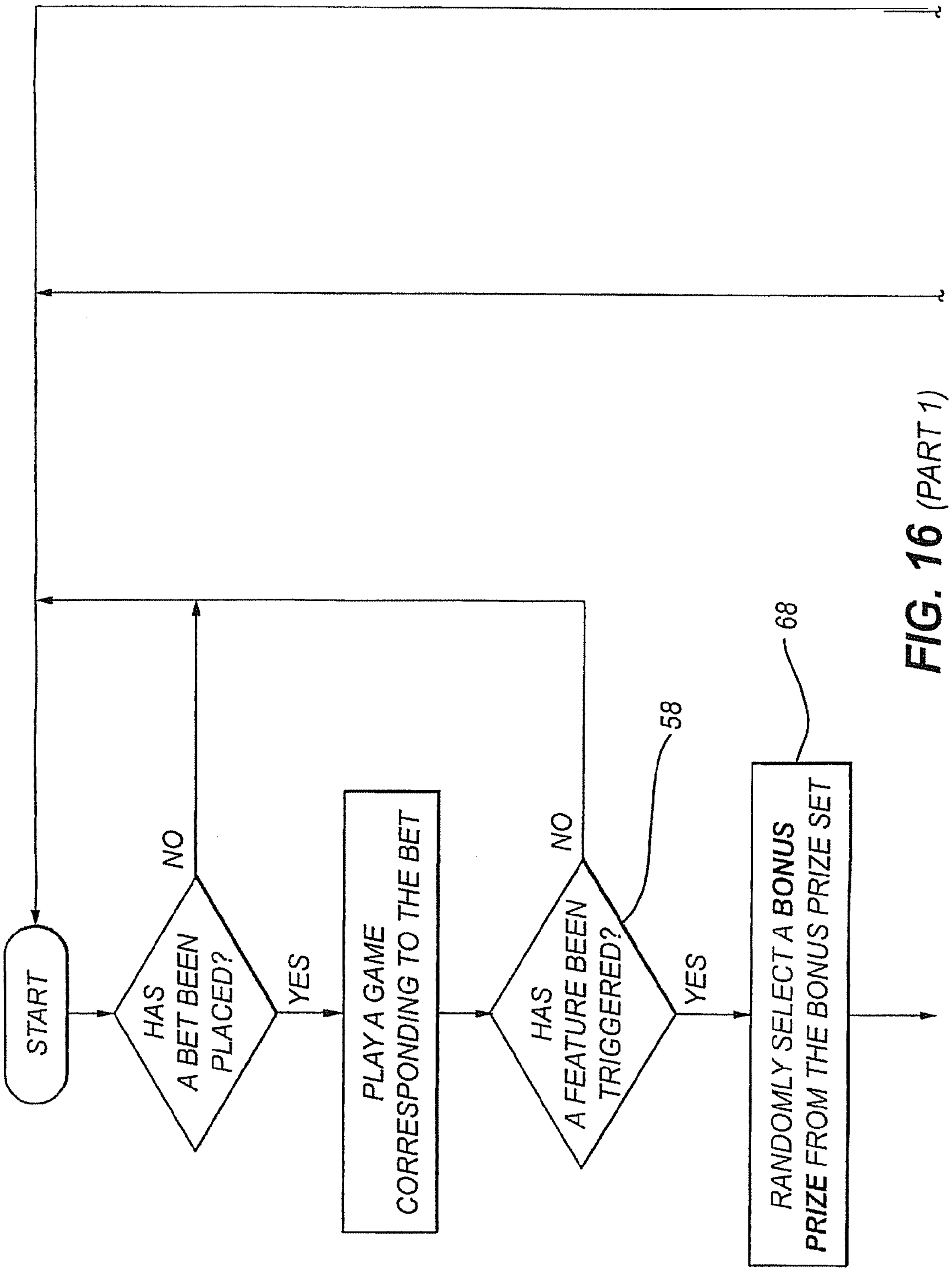
FIG. 16 (PART 1)

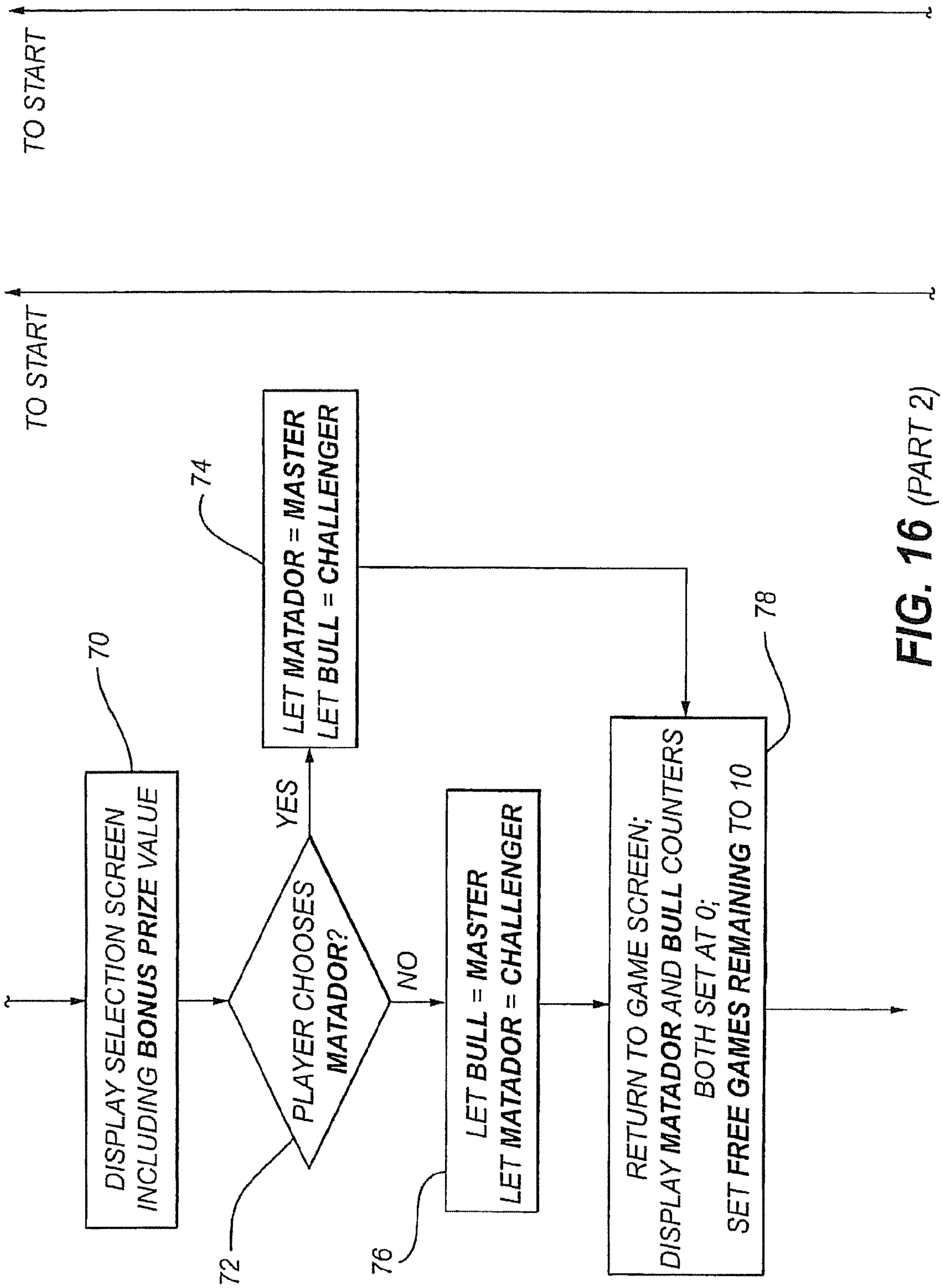
FIG. 16 (PART 2)

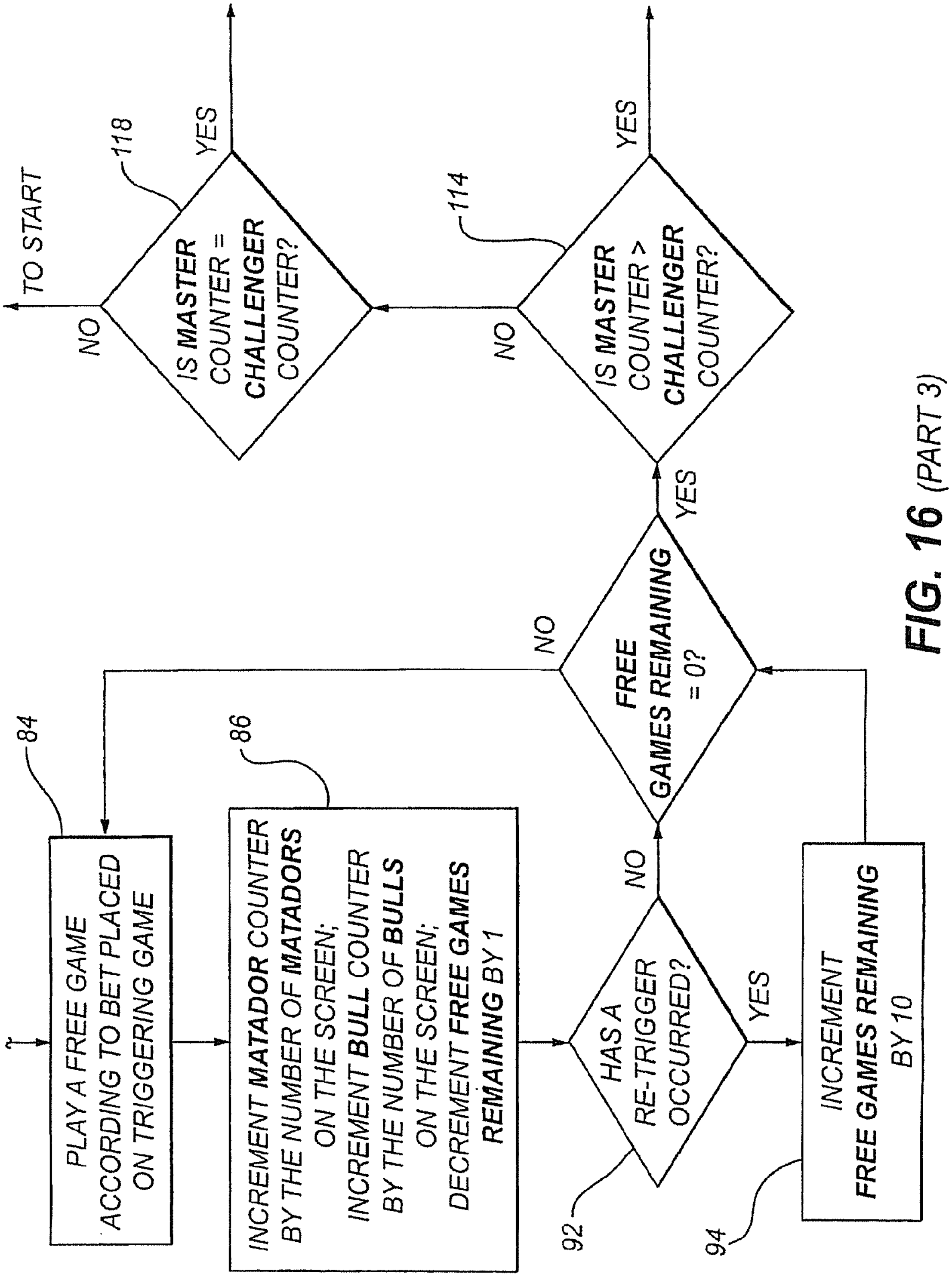
FIG. 16 (PART 3)

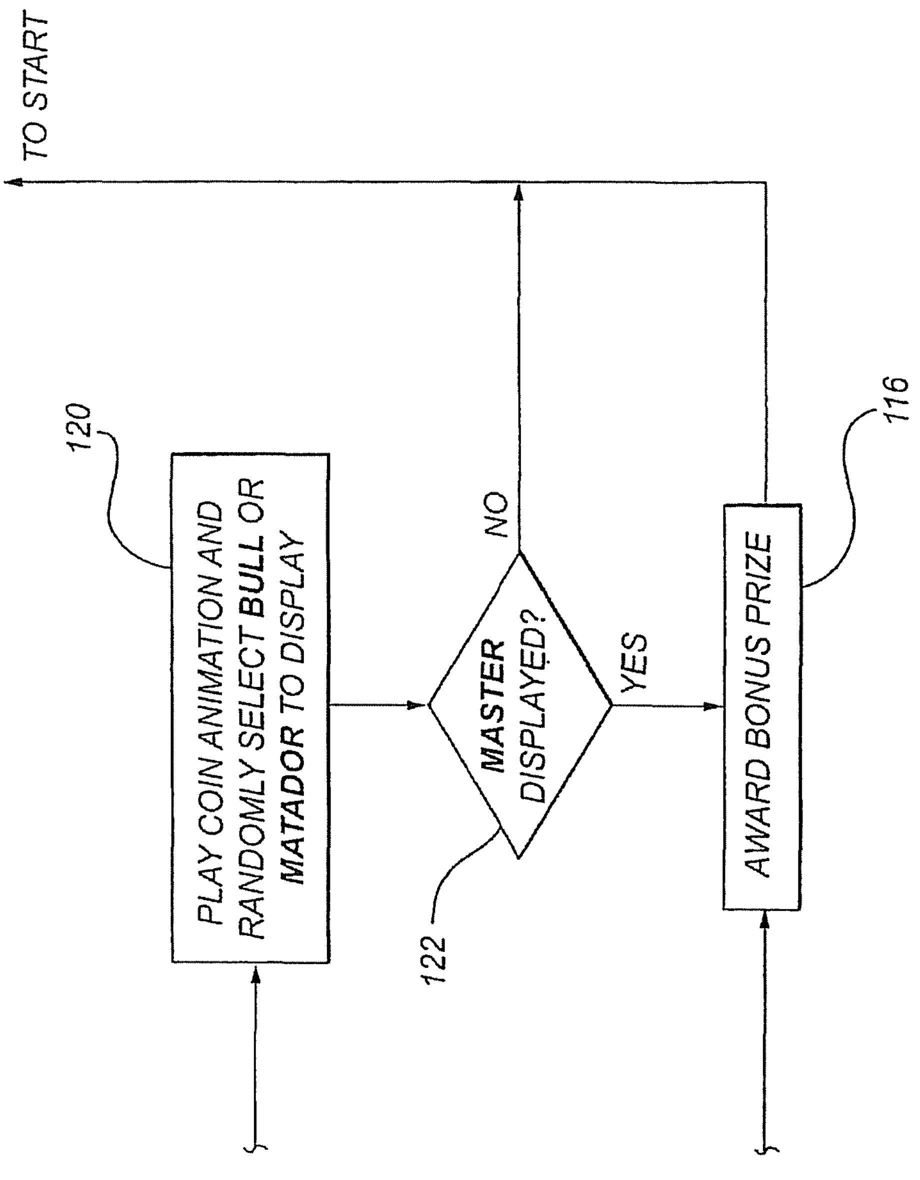
FIG. 16 (PART 4)

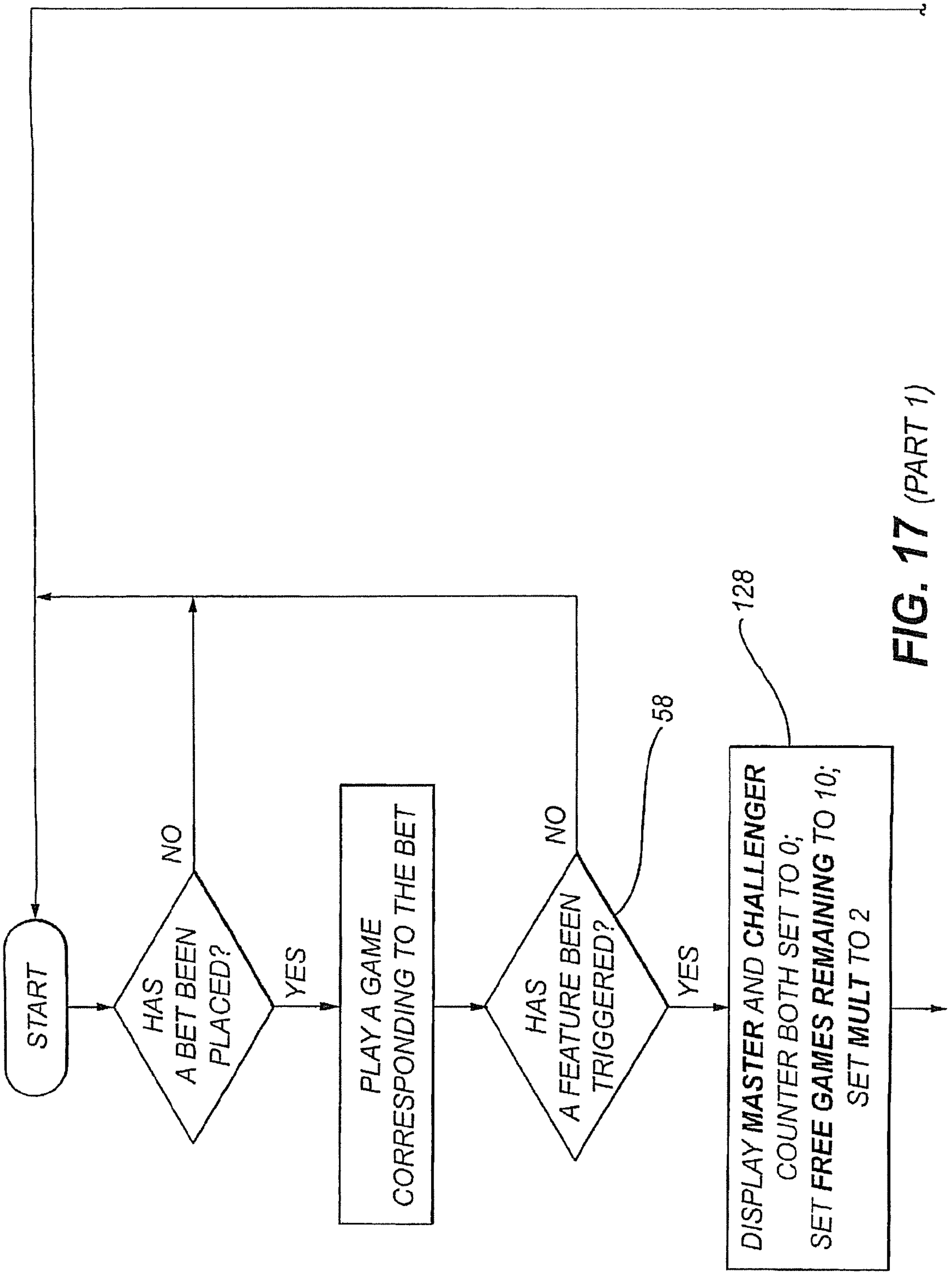
FIG. 17 (PART 1)

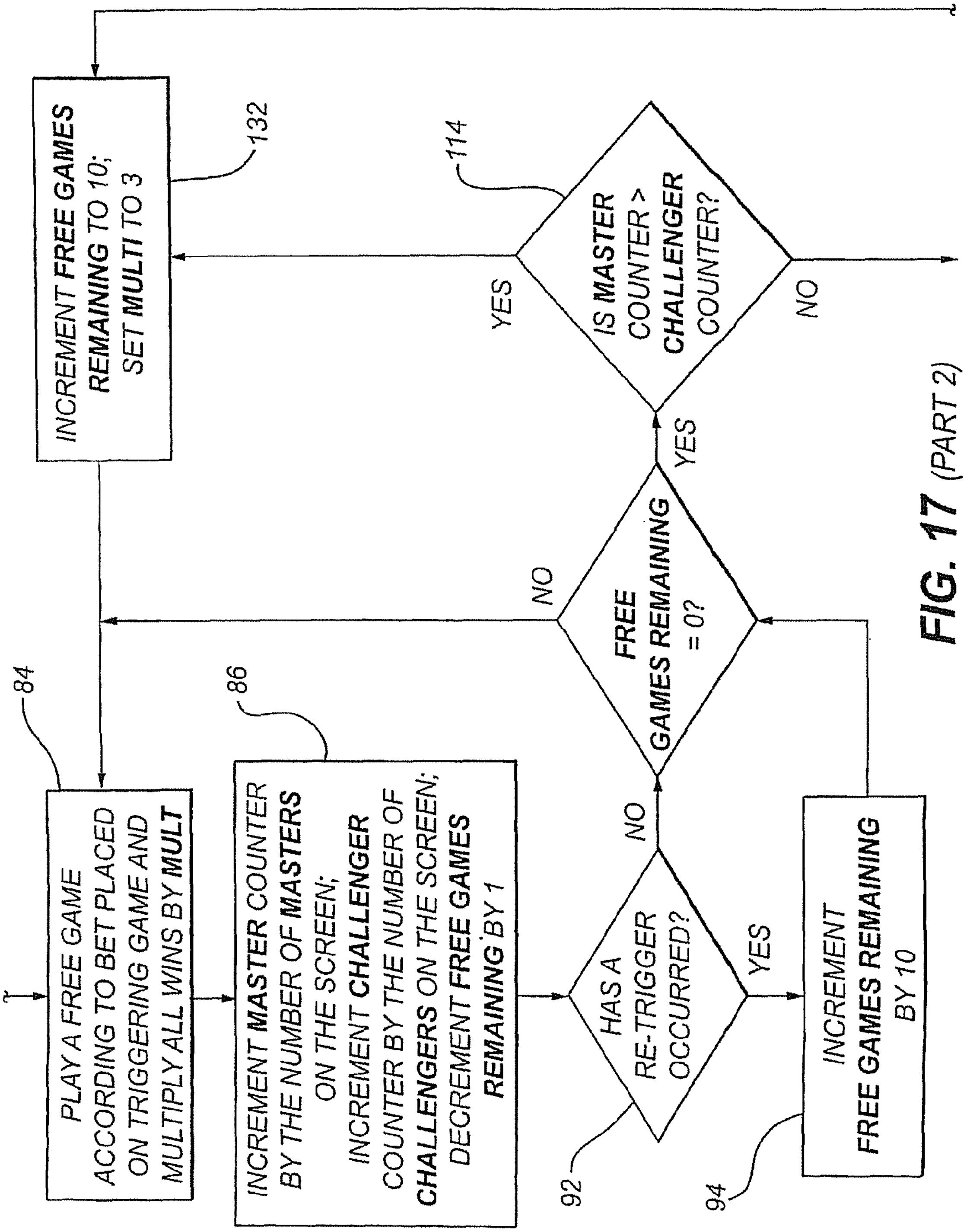
FIG. 17 (PART 2)

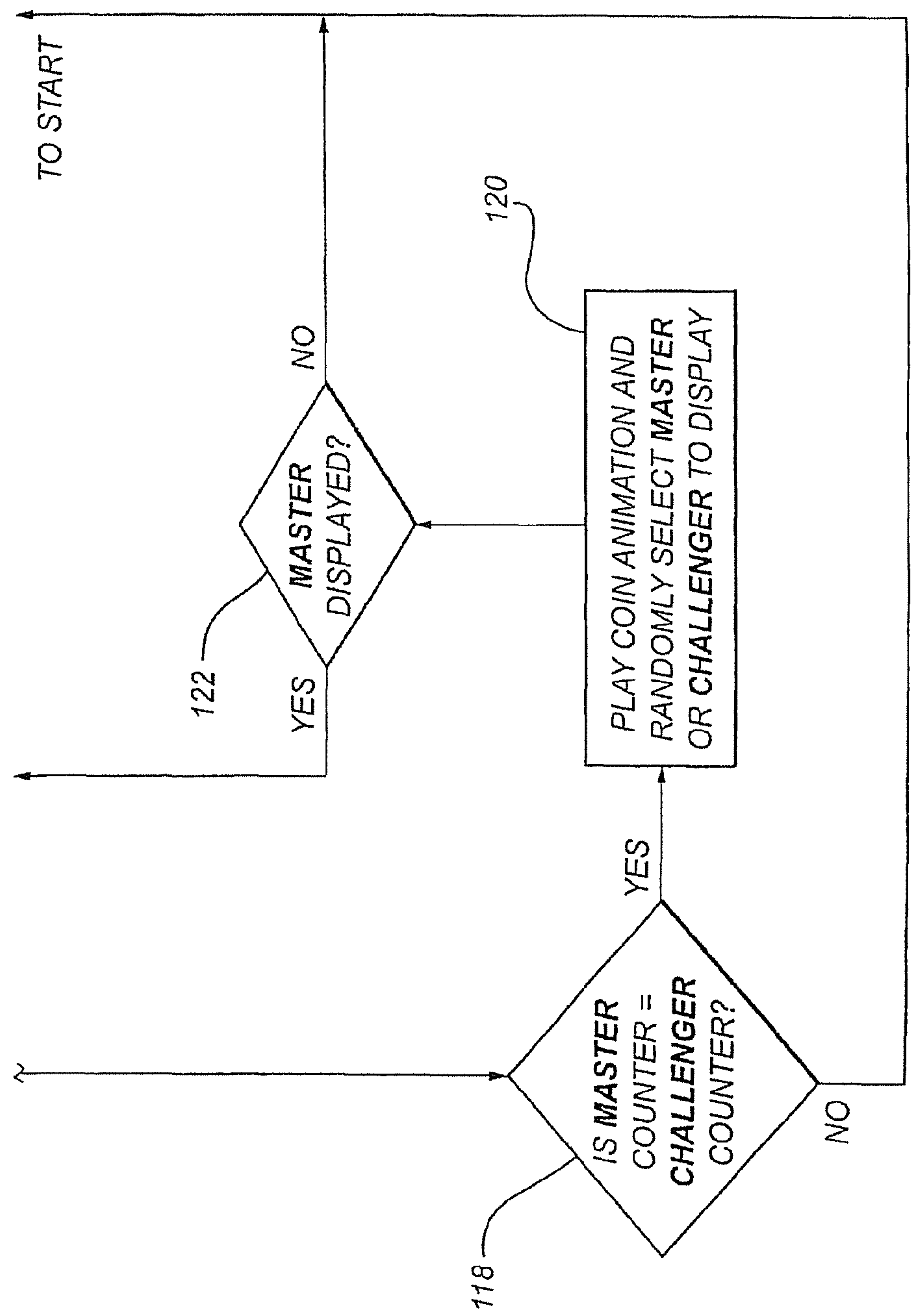
FIG. 17 (PART 3)

GAMING MACHINE WITH CHALLENGE FEATURE

RELATED APPLICATIONS

This application is a continuation of U.S. application Ser. No. 13/153,595, having a filing date of Jun. 6, 2011, which claims priority to, and is a continuation of, co-pending U.S. application Ser. No. 11/336,691, having a filing date of Jan. 18, 2006, which is incorporated herein by reference, and which claims priority to Australian Patent Application No. 2005900207, having a filing date of Jan. 18, 2005, which is also incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to a gaming system, in particular a gaming machine, and a method of gaming. More particularly, the invention relates to a gaming machine operable to play a challenge game feature.

Players who regularly play gaming machines quickly tire of particular games and therefore it is necessary for manufacturers of these machines to develop innovative game features which add interest and variety to the games. In so doing, it is hoped to keep players amused and therefore willing to continue playing different varieties of games as well as to attract new players. Gaming machines of the type described are particularly well known nationally and internationally.

Substantial amounts of money are wagered on these machines. In the state of NSW and other states of Australia, there is a growing tendency to legalise the use of gaming machines by licensing operators with resulting revenue gains being achieved through license fees and taxation of moneys invested. The licensed operation of gaming machines is the subject of state legislation and regulation. Amongst the items regulated is the minimum percentage payout for a gaming machine. For example, a minimum of 85% of monies invested must be returned as winnings and manufacturers of gaming machines must therefore design their machines around these regulatory controls. Therefore, the options available to a gaming machine manufacturer are limited by the gaming regulations of the applicable jurisdiction and by requiring the gaming machine provide a particular return to player.

Different types of accumulator games are known in which, during the course of a series of base games, a symbol of the base game is accumulated as the base game is played. In the event of the symbol count reaching a predetermined number, a prize or free game feature is awarded. In the case of a prize being awarded, the expected return-to-player percentage is difficult to determine as changes in bet structure affect the overall return due to dependency of one base game on another. This complicates the design of gaming machines.

Single counters are also provided in free games, in which a message line counter may appear at the top of a game screen such that the number of specific symbols appearing during the free game series are counted, with the total free game win typically being repeated by the number of specific symbols counted. Whilst such a symbol accumulators or counter features have in the past proved popular, players can easily tire of them, in particular in view of the lack of actual or perceived player involvement in the counting or accumulation process. Also, in feature games such as free games, which often provide an enhanced pay characteristic, the problem of determining the expected return to player percentage may be made more difficult in that the game that provides an enhanced pay out characteristic can award a subsequent game with an enhanced pay out characteristic and so on. This further contributes to the complexity of design.

Many games have had a double up feature, for example, where a player chooses between red and black and the gaming machine then randomly makes a selection and if the player and gaming machine selection matches, the award is increased. This has proved a popular inclusion in gaming machines, adding a further functional component to the gaming machine but maintaining a game in which the odds are easy to calculate. There is a need for alternative gaming systems and machines that provide similar advantages.

BRIEF SUMMARY OF THE INVENTION

According to a first aspect of the present invention, there is provided a gaming system operable to play a game comprising a base game and a feature game, the gaming system comprising a game controller for controlling the play of the base game and the feature game, at least one display in data communication with the game controller to display game play of the base game and the feature game, a player interface in data communication with the game controller to enable the player to control at least some aspect of the game play of the game, the game controller controlling play of the feature game so that the feature game comprises at least one series of game events, in which a plurality of symbols from at least one predetermined symbol set that includes at least first and second symbols, are randomly selected and displayed on the at least one display, and dependent on an outcome of the at least one series of game events, awarding a bonus, wherein the feature game is a challenge feature and during play of the feature game, the game controller maintains in computer memory at least first and second counters for said at least first and second symbols, varies the value of said counters on the occurrence of the at least first and second symbols in the at least one series of game events, causes the at least one display to show a value of the counters, and evaluates the values of the counters against predetermined competitive criteria, wherein the outcome of the series of game events is dependent on said evaluation.

Preferably, the outcome involves one of said at least first and second symbols winning and the others losing and wherein the gaming system is operable to allow a player of the gaming system to use the player interface to select one of said at least first and second symbols, wherein the bonus is awarded only if the symbol selected by the player is the winning symbol in said outcome.

Preferably, play of the base game involves the game controller deducting a credit meter dependent on a wager made in the base game, each game event in the at least one series of game events comprises a game event in the same format as the base game, and the credit meter is not deducted for play of the at least one series of game events. The base game and the feature game may have the format of a spinning reel game so that symbols defined for each reel of the spinning reel game define one of the predetermined symbol sets. The symbols defined for each of the reels of the spinning reel game may also be the same for both the base game and the feature game.

Preferably, the game controller awards the bonus at the conclusion of the at least one series of game events if a predetermined symbol of the at least first and second symbols cumulatively occurs more or less frequently than the other at least first' and second symbols, or if a predetermined symbol of the at least first and second symbols occurs a predetermined number of times before the other at least first and second symbols occur a predetermined number of times. The gaming system may be operable to allow a player of the gaming system to determine which symbol from the at least first and second symbols is said predetermined symbol.

Preferably, the feature game is capable of ending in a draw condition and wherein in the event of the draw condition arising, the bonus is awarded dependent on a further outcome determined by a random number generator. The further outcome may be determined based on the occurrence of the at least first and second symbols in at least one game event.

Preferably, the feature game is capable of ending in a draw condition and wherein in the event of the draw condition arising, the bonus is not awarded.

Preferably, the bonus is one of a value determined and displayed at the commencement of the game feature, a linked or standalone progressive amount and a further series of game events.

Preferably, during the at least one series of game events, the gaming system awards a prize on the occurrence of at least one predetermined event, and wherein the bonus is at least one further series of game events. The at least one further series of game events may be subject to a multiplier. A further series of game events may be awardable from each said series or further series of game events as a bonus, and upon the award of a predetermined number of consecutive bonuses, the game controller awards a prize and ends the feature game.

Preferably, the game controller is operable to incorporate one or more additional symbols from said at least one predetermined symbol set into the feature as one of said at least first and second symbols. The one or more additional symbols may be used as one of said at least first and second symbols only in a second series of game events subsequent to a first series of game events in said at least one series of game events. At least one of said one or more additional symbols may occur with a different frequency from the at least first and second symbols so as to result in it being less likely that a player will be awarded a bonus in the second series of game events relative to the first series of game events. The at least first and second symbols may also represent opponents in a competition to win the bonus, the result of the competition being the outcome of the series of game events.

Preferably, for the at least one series of game events, the at least first and second symbols comprise at least four symbols, and wherein the outcome is dependent on the sum of the number of occurrences of at least two groups of symbols within the at least four symbols.

Preferably, the at least first and second symbols are symbols from the at least one predetermined symbol set.

Preferably, the gaming system is a gaming machine. According to a second aspect of the present invention, there is provided a computerized method of gaming using a system having a game controller, memory readable by the game controller, at least one display for displaying game images and a user interface to receive selections related to game play made by a player of the gaming system, the method comprising the steps of:

a) storing in said memory a definition of a predetermined set of symbols, optionally separated into a plurality of subsets;

b) storing in said memory a definition of at least two special symbols from said predetermined set of symbols;

c) randomly selecting a plurality of symbols from said predetermined set of symbols and displaying the selected plurality of symbols on the at least one display;

d) determining the number of times each said special symbol occurs in the selected plurality of symbols and varying a counter formed in said memory and associated with each special symbol dependent on said determination;

e) repeating steps c) and d) at least once;

f) dependent on an evaluation of the values of the counters based on predefined competitive criteria, awarding a bonus to the player of the gaming system.

Preferably, the method further comprises allowing a player of the gaming system to use the player interface to select one of the special symbols, wherein step f) comprises awarding the bonus to the player only when the value in the counter for said selected symbol after step e) has been completed is one of:

a) greater than or less than the counters for the other special symbols; and b) at or above a threshold amount before the counter associated with the other special symbols reach a respective threshold amount.

Preferably, certain of the values in the counters result in a draw condition, and wherein if a draw condition arises, the method further comprises selecting one of the special symbols based on the output from a random number generator and awarding the bonus only if a predetermined one of the special symbols is selected. Alternatively, certain the values in the counters result in a draw condition, and wherein if a draw condition arises the method comprises not awarding the bonus.

Preferably, the bonus is selected from the set of a value determined and displayed at the commencement of the game feature, a linked or standalone progressive amount, and at least one further series of game events comprising multiple repetitions of steps c) and d).

Preferably, the bonus is a game in which at least one further series of game events comprising multiple repetitions of steps c) and d) and dependent on the value of the counters, a second bonus is awarded. The second bonus may be a game in which at least one still further series of game events comprising multiple repetitions of steps c) and d) and dependent on the value of the counters, a third bonus is awarded. The third bonus may be either an amount of credits or a bonus of the same type as the second bonus. The counters may be reset between play of the bonuses. The method may further comprise decreasing the probability of the award of each subsequent bonus.

Preferably, the method is implemented on a gaming system having a base game, wherein the method is invoked only after a predetermined trigger event occurs that is related to play of the base game.

Further aspects of the present invention will become apparent from the following description, given by way of example of the preferred embodiments and with reference to the accompanying drawings.

Throughout the specification the term “comprise” and variations on this term including “comprising” and “comprises” are to be understood to imply the inclusion of a feature, integer, step or element, and not to exclude other features, integers, steps or elements.

BRIEF DESCRIPTION OF SEVERAL VIEWS OF THE DRAWINGS

FIG. 16 shows a flowchart of the first embodiment of a game played on the gaming machine of FIG. 1, implemented in game logic on the game controller, and FIG. 17 shows a flowchart of the second embodiment of a game played on the gaming machine of FIG. 1, implemented in game logic on the game controller.

DETAILED DESCRIPTION OF THE INVENTION

Figure 1:
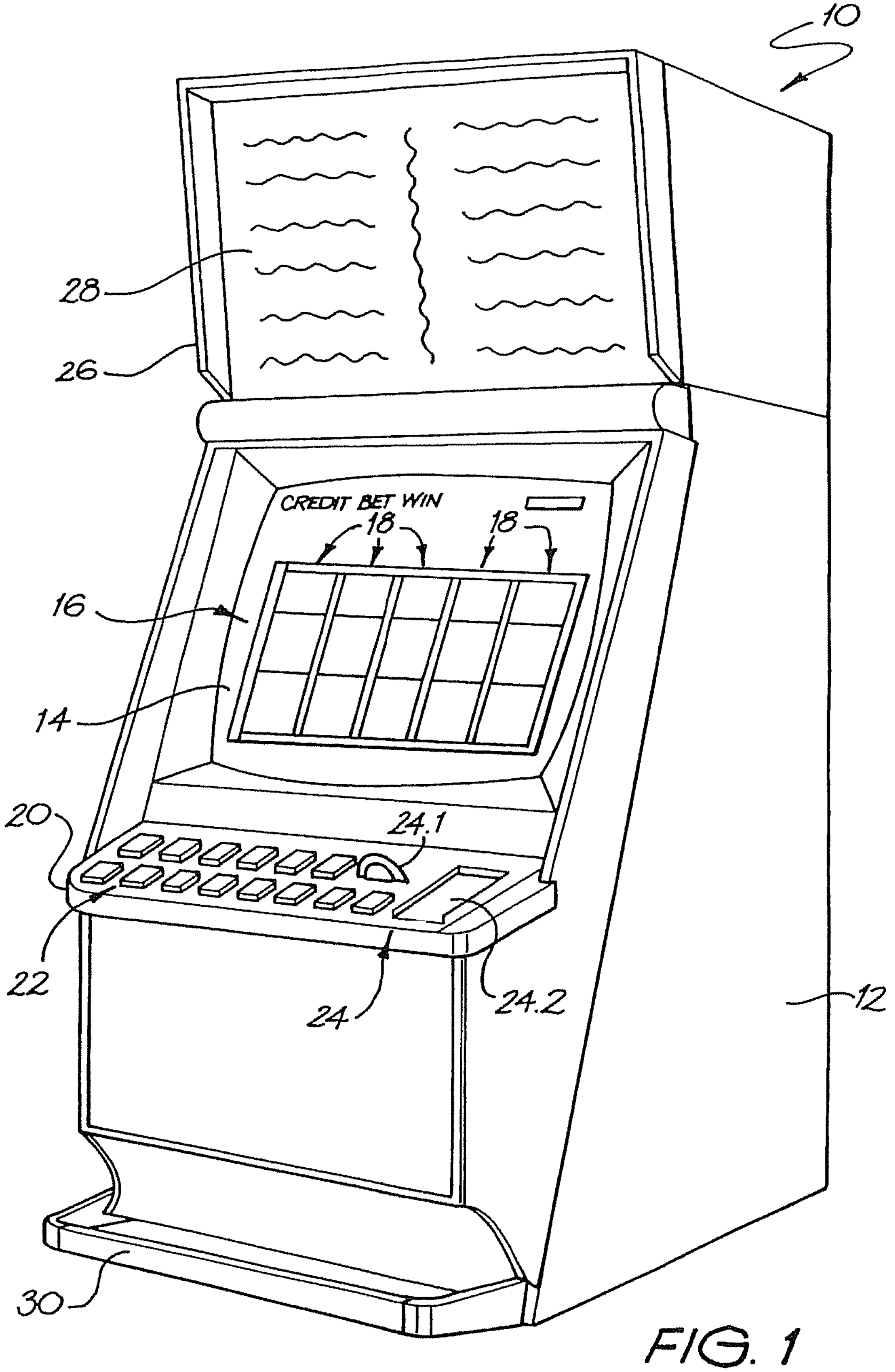
FIG. 1 shows a perspective view of a gaming machine suitable for implementing the present invention.

In FIG. 1, reference numeral 10 generally designates a gaming machine suitable for implementing the present invention. The machine 10 includes a console 12 having a display means in the form of a video display unit 14 on which a game 16 is played in use. The video display unit 14 may be implemented as a cathode ray screen device, a liquid crystal display, a plasma screen, or the like.

The game 16 shown in FIG. 1 is a diagrammatic representation of a spinning reel game, which simulates the rotation of a number of spinning reels 18, preferably from three to five. A midtrim 20 of the machine 10 houses a keypad 22 containing buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc. A coin tray 30 is mounted beneath the console 12 for cash payouts from the machine 10.

Figure 2:
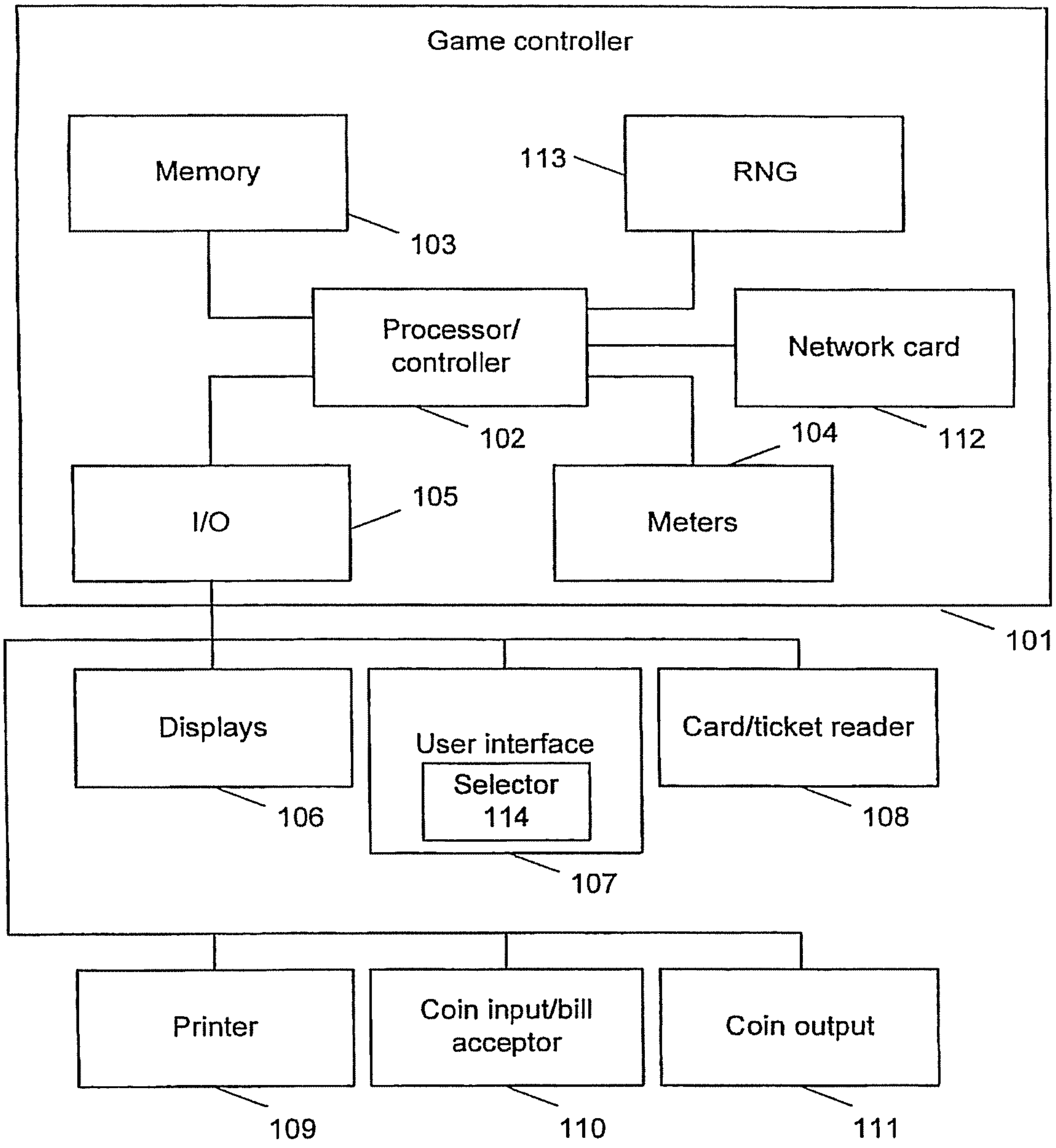
FIG. 2 shows a schematic block diagram of a gaming system suitable for implementing the present invention. The gaming system may be in the form of a gaming machine similar to the gaming machine shown in FIG. 1.

FIG. 2 shows a block diagram of a gaming system, generally referenced by arrow 100, suitable for implementing the present invention. The gaming system 100 may be, for example, a standalone gaming machine of the type shown in FIG. 1. However, the gaming system 100 may be a networked gaming machine or have distributed components. Accordingly, different reference numerals have been used in FIG. 2 from FIG. 1 for components that may be equivalent.

Figure 18:
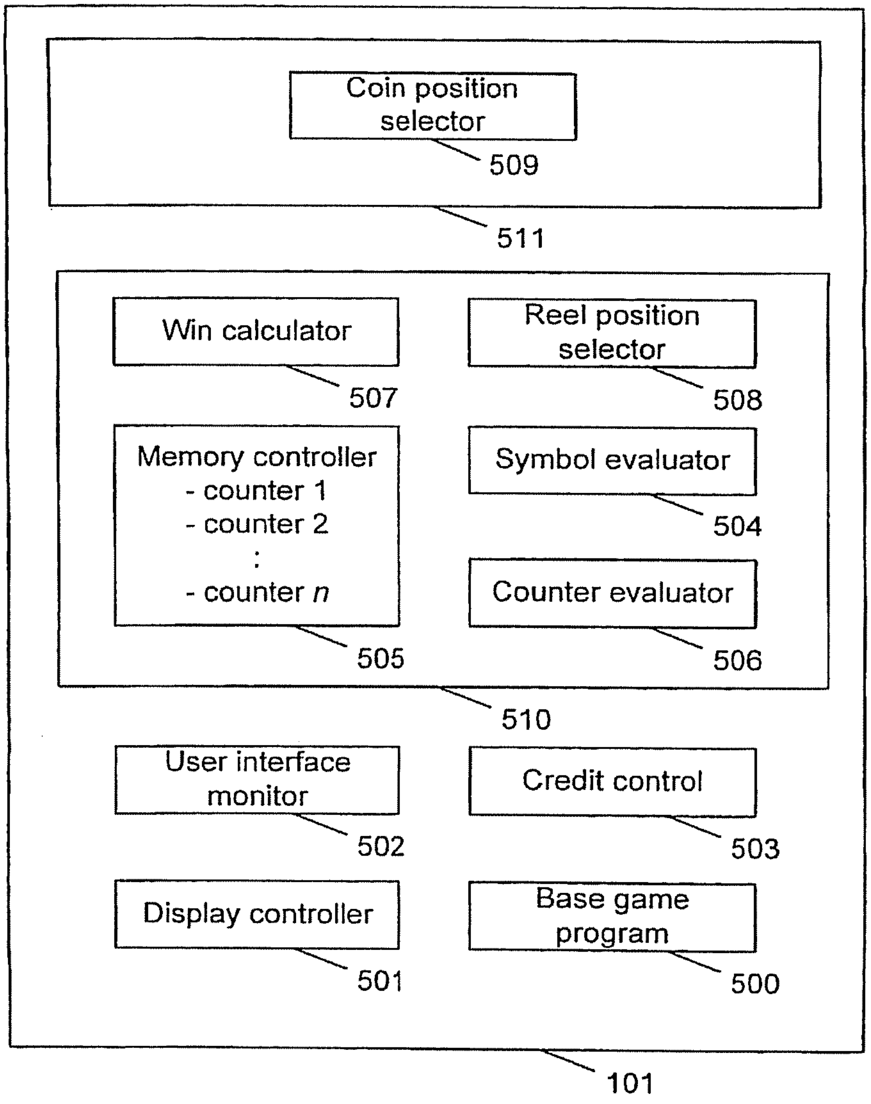
FIG. 18 shows a functional block diagram of the processor/controller shown in FIG. 2.

The gaming system 100 includes a game controller 101, which may include a microprocessor, microcontroller, programmable logic device or other computational device 102. Where the gaming system 100 is a gaming machine, the game controller 101 will typically be provided entirely within the gaming machine. In other gaming systems, the controller may have distributed component parts. Instructions and data to control operation of the computational device 102 are stored in a memory 103, which is in data communication with the computational device 102. The instructions for the computational device 102 result in the computational device 102 having various functions in the normal manner. The main functions of the computational device 102 are shown in FIG. 18 and described herein below with additional reference to FIGS. 3 to 15, which show a series of screen displays from an example gaming system implemented in accordance with the present invention and FIGS. 16 and 17, which show flow diagrams of two example processes implemented by the computational device 102.

Typically, the gaming system 100 will include both volatile and non-volatile memory and more than one of each type of memory, with such memories being collectively represented by the memory 103. In addition, the functions of the computational device 102 may be separated into separate modules. The instructions to cause the game controller 101 to implement the present invention will be stored in the memory 103.

The gaming system may include hardware meters 104 for the purposes of regulatory compliance and also include input/output ports 105 for communicating with the peripheral devices of the gaming system 100. In FIG. 2, the peripheral devices that communicate with the controller are one or more displays 106, user interfaces 107, including in particular a selector 114 for allowing selection of the matador or the bull (see herein below), card and/or ticket readers 108, printers 109, coin input mechanism and/or bill acceptor 110 and a coin output mechanism 111.

In addition, the gaming system 100 may include a communications interface, for example a network card 112 to communicate with a network for such purposes as sending status information, accounting information and the like to a central controller, allowing communication from the central controller to the gaming system 100 or for other purposes.

The outcomes of the gaming system, in accordance with the game process implemented by the gaming system as described herein below, are determined by a random number generator (RNG) 113. Various random number generators suitable for use in a gaming system will be known by the normally skilled person in the relevant arts and therefore the RNG 113 will not be described further herein. In some implementations of the present invention, the RNG 113 may be part of the computational device 102.

Figure 2A:
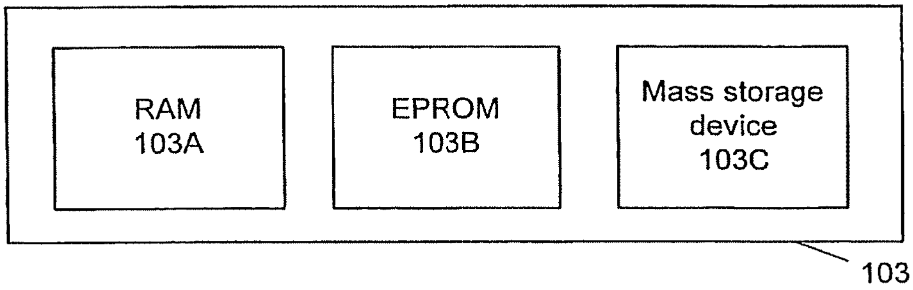
FIG. 2A shows a schematic block diagram of components of the memory of the gaming system of FIG. 2.

FIG. 2A shows an example of the main memory components that may comprise the memory 103. Each memory component will typically communicate with the computational device 102 through an address and data bus.

A random access memory (RAM) 103A may temporarily store programs that provide the computational instructions for the computational device 102 and also temporarily store data related to execution of the programs. An EPROM 103B may store a boot program for the game controller 101 and may also store instructions for the loading of programs from a mass storage device 103C. The mass storage device 103C may be, for example, a hard drive, CD, DVD, static RAM, flash drive, EPROM or the like. Some programs may be stored in the EPROM 103B.

A description will now be given of the operation of the present invention. The following description assumes that the present invention is implemented by the gaming machine 10, but as explained herein above, the present invention may be implemented in other gaming systems.

Figure 3:
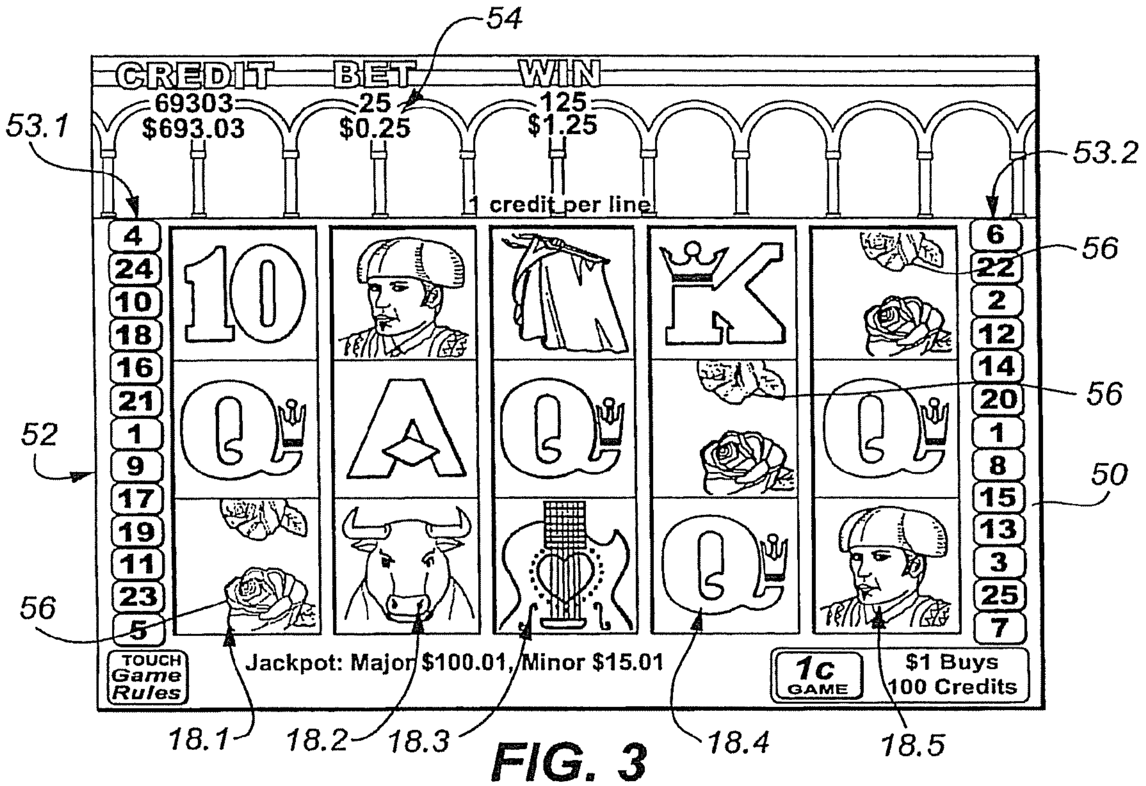
FIG. 3 shows a screen display of a base game of a game, also in accordance with an embodiment of the invention, played on the gaming machine of FIG. 1, and displaying a triggering event.

Referring now to FIG. 3 of the drawings, reference numeral 50 generally designates a trigger screen display of a base game 52 of a game 16 played on the gaming machine 10. Play of the base game 52 is controlled by a base game program 500 (see FIG. 18) in accordance with the most preferred embodiment of the present invention, which is implemented as a feature game of base game. The game 16 is a spinning reel game having a video representation of five spinning reels 18.1 to 18.5, each spinning reel carrying a series of images. The stopping position of each reel 18.1 to 18.5 is determined by the base game program 500 dependent on an output from the RNG 113, which is received by a reel position selector 508 (see FIG. 18) and matched with a predetermined associated reel position. A display controller 501 implemented by the computational controller 101 controls the display 14 to display the representations of the base game 500 and a feature game 510.

The game 16 has 25 paylines on which the player can bet, in numbered payline indicator columns 53.1 and 53.2 flanking the reels 18.1 to 18.5. It can be noted from a bet meter 54 in the screen display 50 that the player has bet on all 25 paylines, with 25 cents being bet on each payline. The player uses the bank of buttons 22 (or user interface 107 for gaming system 100, which may include a touch screen) to indicate the bet that they wish to make. A user interface monitor 502 (see FIG. 18) monitors the bank of buttons 22 for the depressing of a button, for example by polling a line connected to each button in the bank of buttons 22.

The trigger screen display includes a combination of three scattered rose symbols 56. The occurrence of three or more of the rose symbols 56 results in a trigger condition, which acts to trigger a game feature of the game 16. Those skilled in the relevant arts will appreciate that there are numerous alternative events that may be used as trigger conditions. Once the trigger condition has occurred, control of the computational controller 101 is passed from the base game 500 to a feature game 510 (see FIG. 18).

The feature game 510 is a series of free challenge games, which in the particular embodiment amounts to ten free games. After the feature has been triggered, as is illustrated at step 58 in FIG. 16, an initial selection screen display 60 (see FIG. 4) allows the player to select using the selector 114, as a winning symbol, a matador symbol 62 or a bull symbol 64. The selector 114 may be implemented as a touch-screen, with the player choosing the winner by touching the matador image 62 or the bull image 64.

Figure 4:
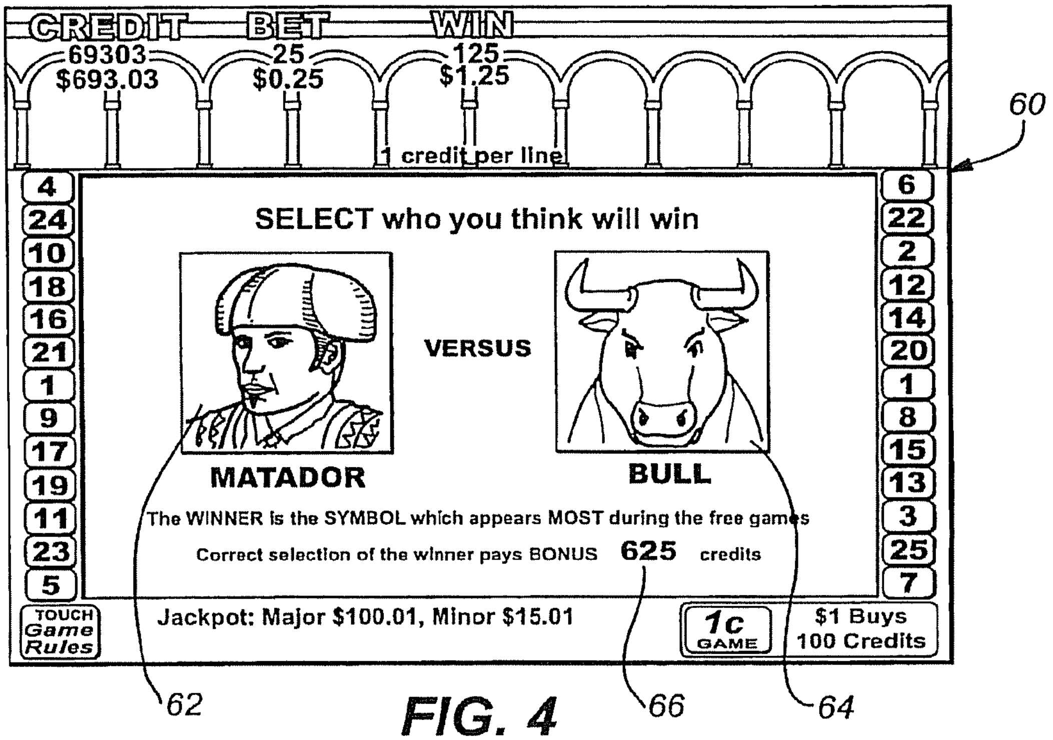
FIG. 4 shows an initial screen display of a game feature of a first embodiment of the game following the base game.

At the conclusion of the free games, the winner is indicated as the symbol that appeared most frequently during the free games and if the player was the winner, they receive a bonus prize 66. The bonus prize 66 (in this case a bonus of 625 credits) is randomly selected, in this embodiment before play of the free games and is displayed to the player, as is indicated in FIG. 4 and at steps 68 and 70 in FIG. 16. The bonus may alternatively be a second screen feature, or a win multiplier (including a trigger win multiplier or a free game win multiplier). Ultimately, any winning or losing amount is credited to or deducted from the meters 104 by a credit control module 503.

Preferably, the reel strips are laid out such that there are exactly the same number of bulls and matadors in each reel, with the players choice accordingly not affecting the expected return to the player of the game. In the event of the player choosing the matador at step 72, the matador becomes the master and the bull becomes the challenger; as is shown at step 74. Alternatively if the bull if chosen, the bull becomes the master and the matador the challenger, as is indicated at step 76.

A series of ten free games, with the game screen displaying the same five reels 18.1 to 18.5, is commenced at step 78 in FIG. 16, the stopping position of each reel for each spin being determined by the RNG 113. After the stopping position has been determined, a symbol evaluator 504 determines how many matadors and how many bulls have been thereby effectively selected for display on the display 14 in one of the reels 18.1 to 18.5. The computational controller 101 uses a memory controller 505 to maintain matador and bull counters 80 and 82 in a writable part of the memory 103, for example the RAM 103A (in which case appropriate data storage and/or recovery mechanisms may be required to ensure the game can be restored in the event of an outage, for example a power outage), and updates the counters 80, 82 in accordance with the number of occurrences of each symbol, as determined by the symbol evaluator 504. The display controller 201 also causes a representation of the matador counter 80 and bull counter 82 to be displayed in the top right corner of the screen 50, as shown in FIG. 5.

Figure 5:
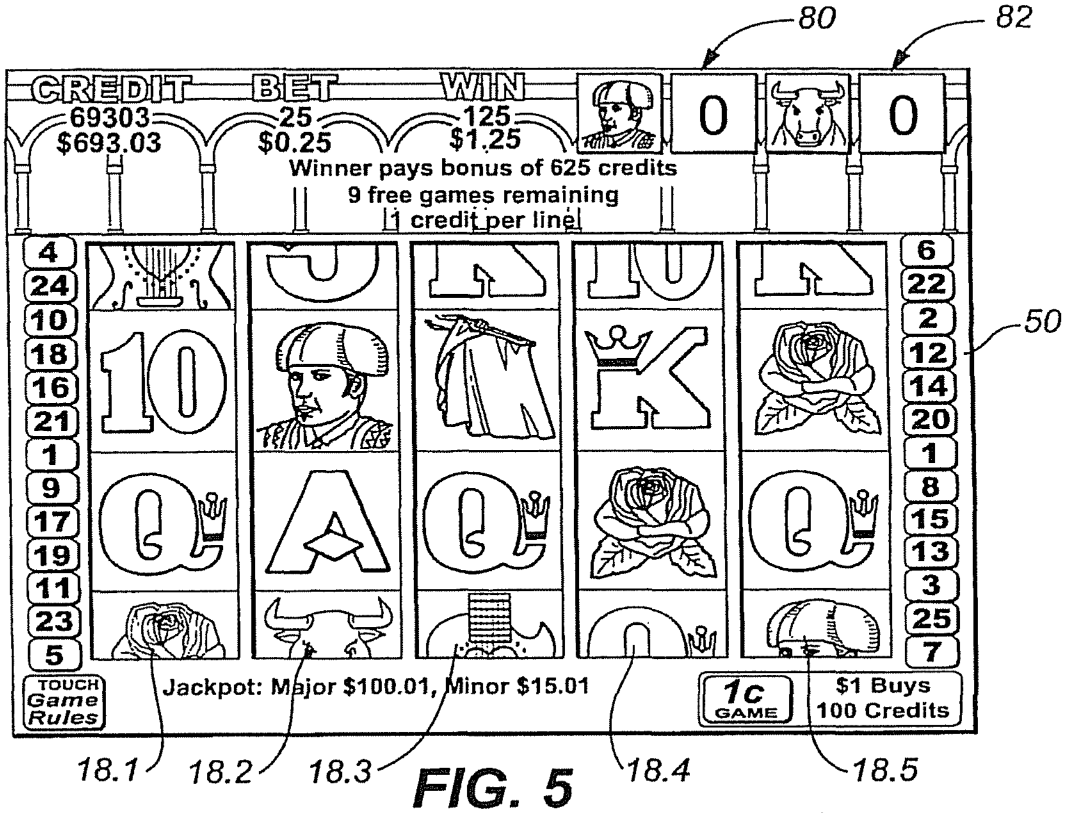
FIG. 5 shows an initial screen display during the playing of a first free game in the game feature of FIG. 4.

When the first free game commences and the reels are still spinning, the display may appear as indicated in FIG. 5, with the free games being played according to the bet placed on the triggering game at step 84. Each matador and bull symbol which appears after the reels stop spinning for any free game will be counted one-by-one by the symbol evaluator 504 at step 86.

Figure 6:
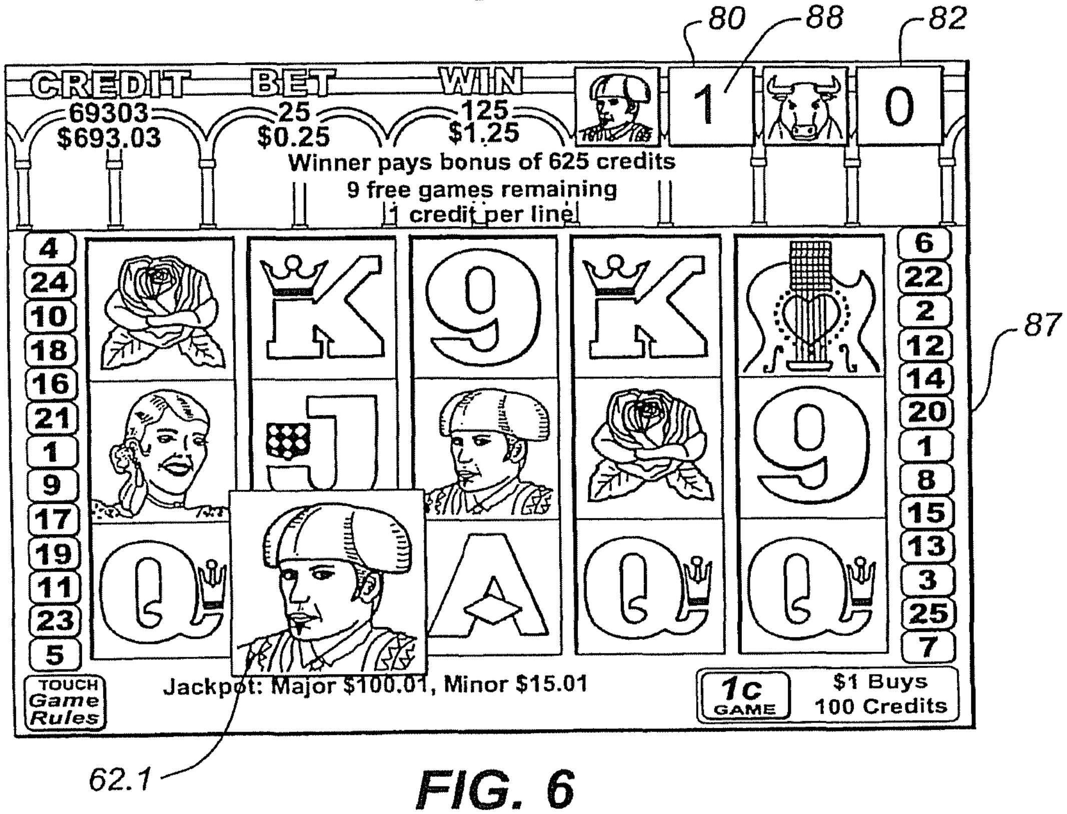
FIG. 6 shows a subsequent screen display during the playing of the first free game.
Figure 7:
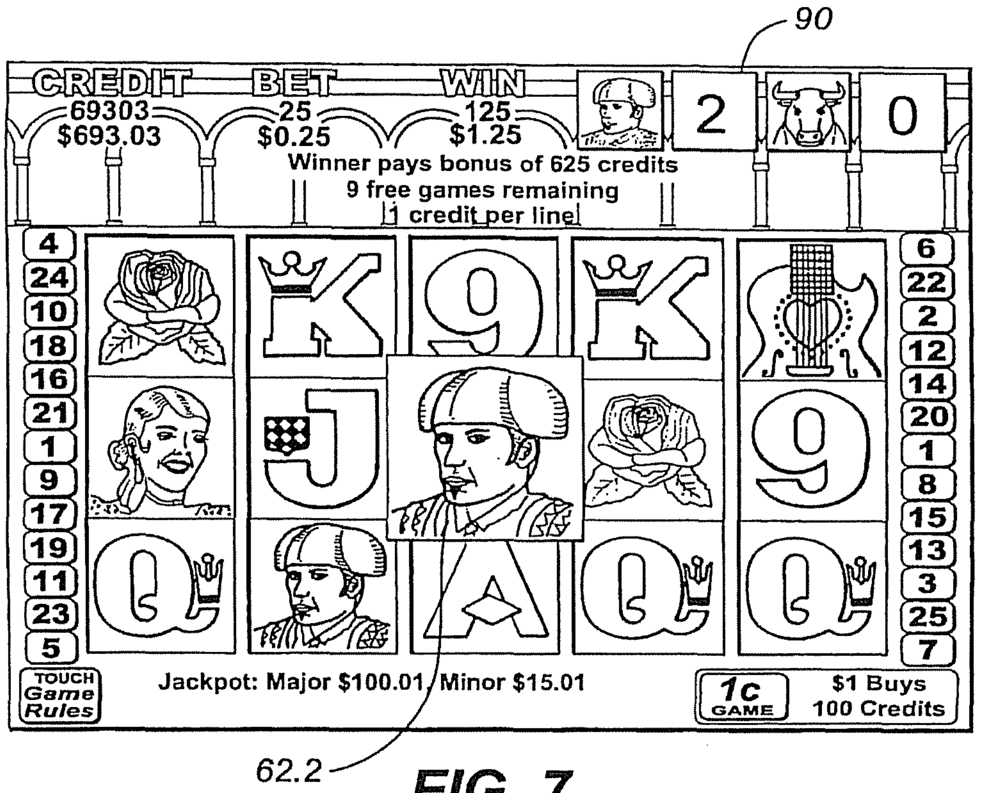
FIG. 7 shows a screen display at the end of the playing of the first free game.

FIG. 6 shows a typical screen display 87 after the first free game, in which two matador symbols 62 have been spun up. The display controller 501 then causes each relevant symbol to animate and a special sound is played. The controller 101 increments the matador or bull counters 80, 82 by one to coincide with each animation, their values are displayed on screen and their updated values are written to memory by the memory controller 505. In FIG. 6, the leftmost matador symbol 62.1 will animate first and the relevant counter will increment by one, as is shown at 88. The subsequent matador symbol 62.2 then animates, and the counter increments again by one, as is shown at 90 in FIG. 7.

During play of the free games, a win calculator 507 in the game controller 101 may compare the symbols displayed in the relevant paylines for the game with predetermined winning combinations, and then increment a win meter by the applicable prize in credits. The win calculator 507 may look up a pay table stored in memory 103 to determine the prize. Alternatively, no prizes may be awarded in the series of free games, the only available prize being the bonus prize 66.

Additional free games can be triggered during the series of free games, as is shown at step 92 in FIG. 16, in the event of a combination of three or more rose symbols appearing, with the number of free games remaining increasing by ten, at step 94. At the end of the free game series, (including all re-trigger games), the counters for all of the matadors and bulls that have been spun up on each free game are then checked. If the one that the player has selected is higher than the other, then the player is given the bonus prize that was presented to them at the start of the feature.

Figure 8:
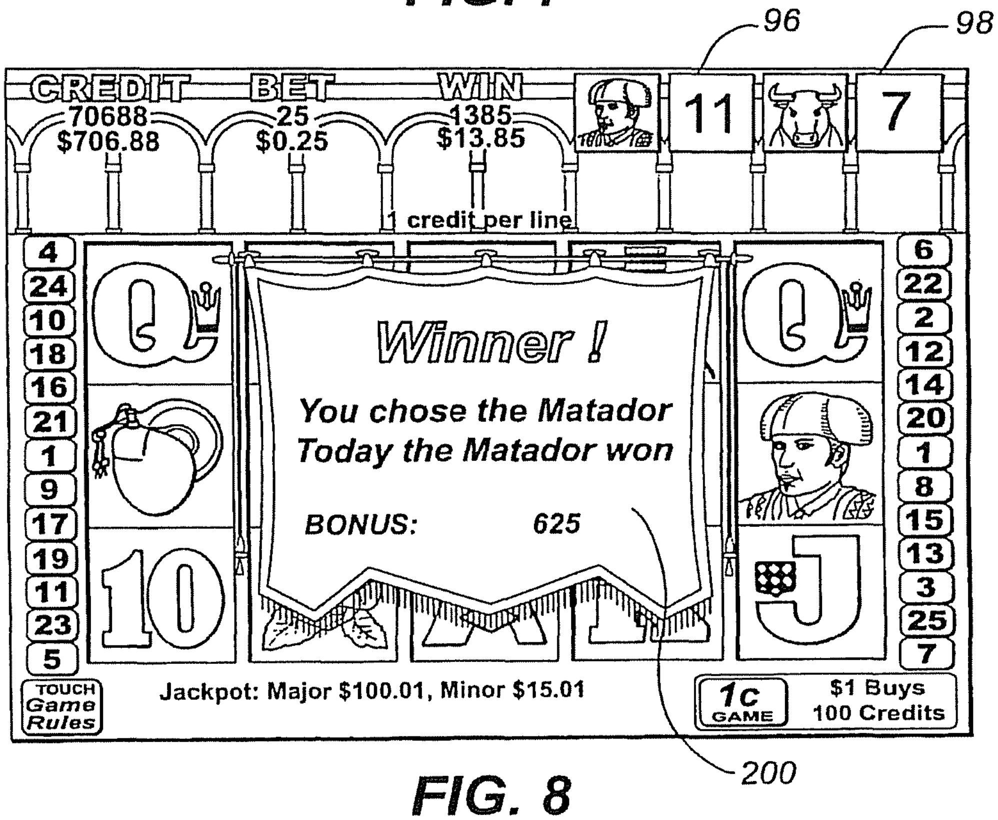
FIG. 8 shows a screen display at the end of the game feature after all free games have been played and the player has correctly selected the winner.
Figure 9:
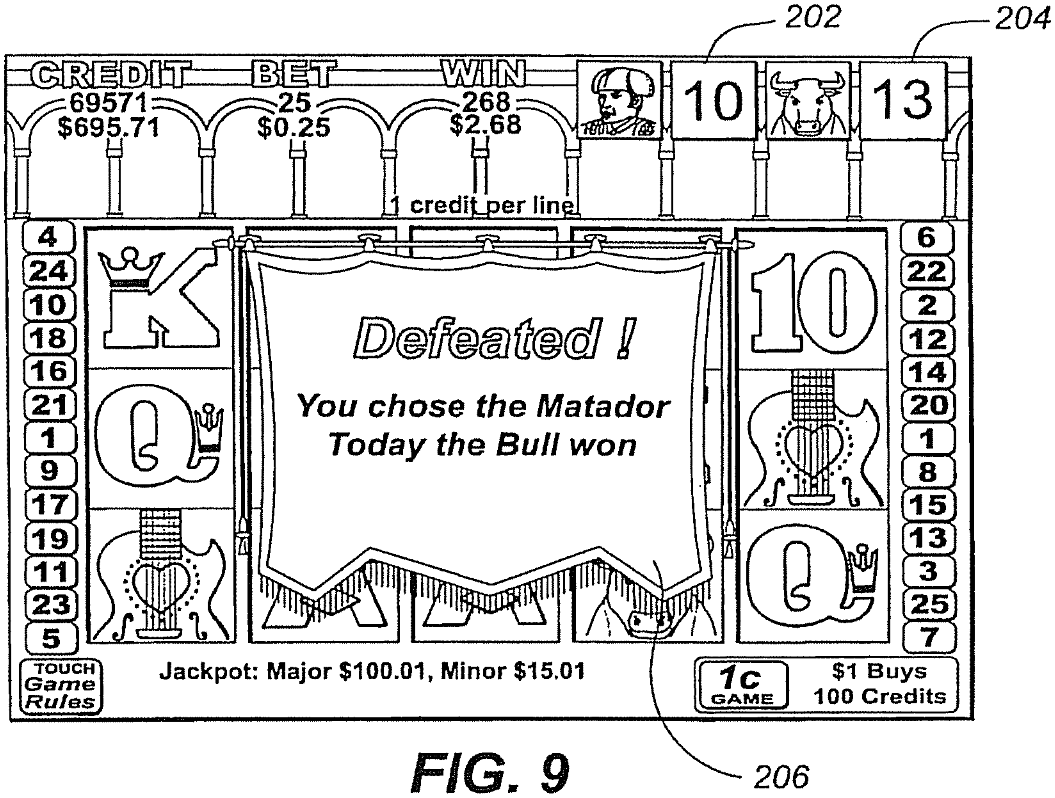
FIG. 9 shows an alternative screen display after all free games have been played in which the player has selected the loser.

If the outcome of the free games requires the matador and bull counters 80, 82 to be evaluated against competitive criteria at the completion of the free games, then once the free games and any additional free games that have been awarded have been completed, the matador and bull counters 80, 82 are evaluated by a counter evaluator 506 of the game controller 101. FIG. 8 shows a winning result for a player who selected the matador and where the competitive criterion is the highest value in the counter. In the example shown, the number of matadors counted (11) exceeds the total number of bulls counted (7), as is indicated at 96 and 98 respectively, and consequently a win message banner 200 is displayed on the screen, resulting in the game controller 101 allocating 625 credits to the player. If on the other hand, the number of bulls counted (13) exceeded the number of matadors counted (10), as is shown at 202 and 204 in FIG. 9, a 'defeated' message 206 is displayed on the game screen and no prize is added.

In an alternative embodiment, the credits awarded to a player may be dependent on the number of matadors counted. For example, 50 credits may be awarded for each matador, in which case in the previously described example, the win calculator 507 would calculate the applicable award of 550 credits. The number of credits awarded per matador (or bull if the bull is the master) may be fixed, determined randomly, or otherwise determined.

Figure 10:
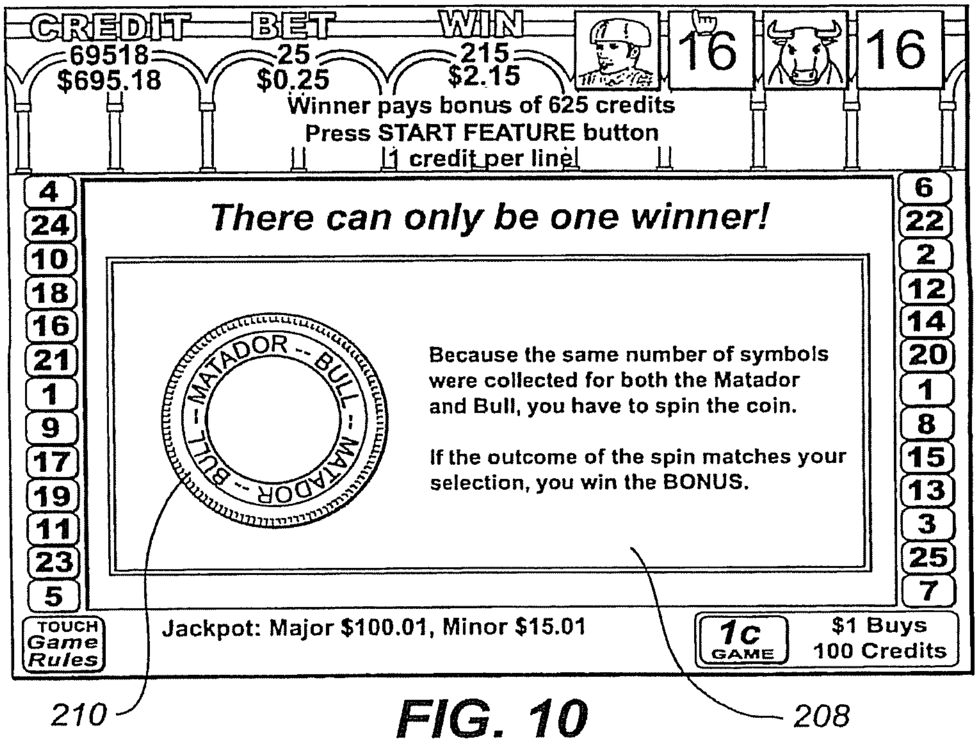
FIG. 10 shows an alternative screen display towards the end of a game feature representing a draw outcome and initiating a coin spin routine.

FIG. 10 illustrates the case where the bull and matador counters are both equal (16 a piece), in which case control of the controller 101 is passed to a further feature game 511. In the further feature game, the display controller 501 displays a coin display screen 208 on the display 14, and the player is prompted to press the start feature button. Alternatively, the coin 210 on the touch screen may be pressed to spin the coin. Once the user interface monitor 202 detects the required user input, the coin 210 then undergoes a spin animation and eventually stops with either a bull or a matador showing to represent the winner, display of the bull or matador dependent on a symbol selector 509, which makes the determination based on an output received by the RNG 113. Only if the coin face that is showing matches the player's selection will the bonus prize be paid by the win calculator 507.

Figure 11:
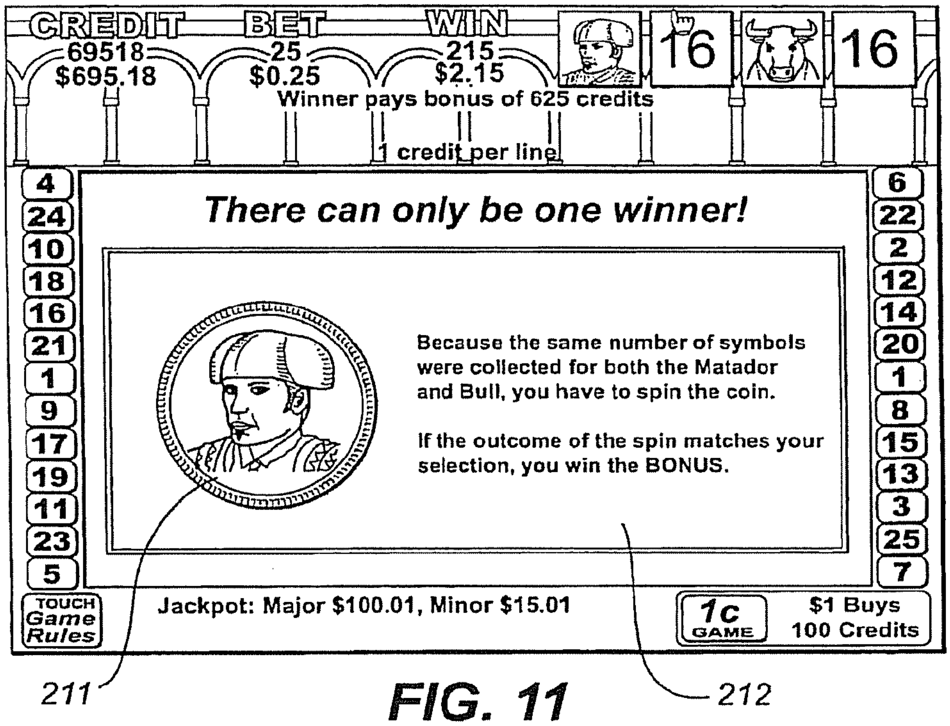
FIG. 11 shows a screen display at the end of the coin spin routine, in which the outcome of the spin matches the player selection.

FIG. 11 shows a screen where the chosen matador 211 is displayed on the screen 212, with the result that the win banner 200 is displayed as per FIG. 8. The flowchart of FIG. 16 indicates the underlying win/draw/lose controller logic at steps 114 to 122.

Figure 12:
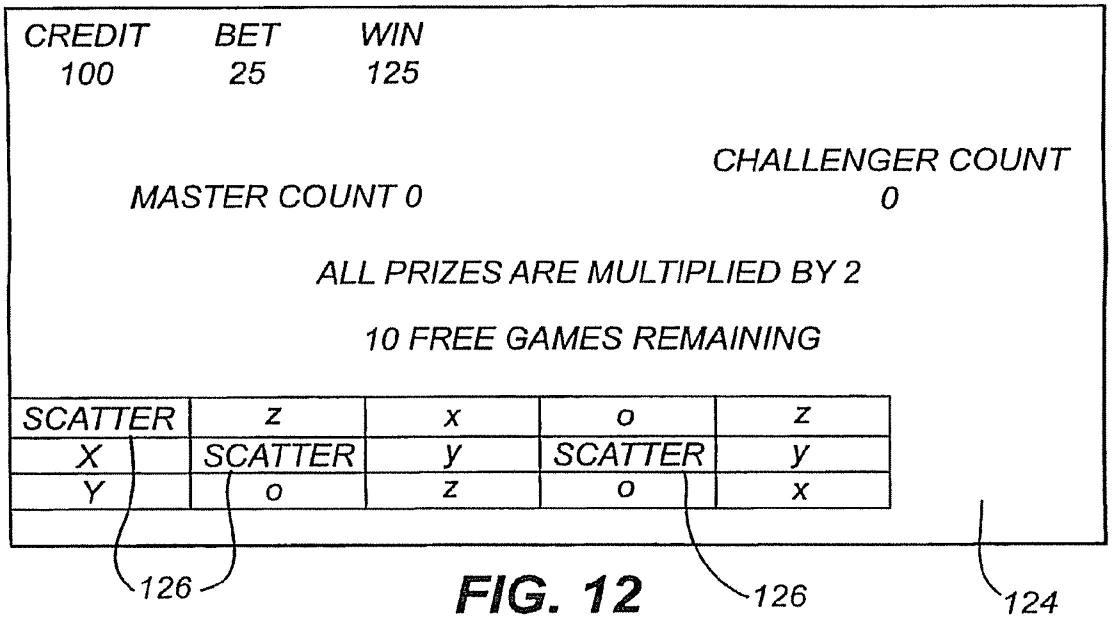
FIG. 12 shows a diagrammatic representation of a screen display of a base game of a second embodiment of the game of the invention, played on the gaming machine of FIG. 1.
Figure 13:
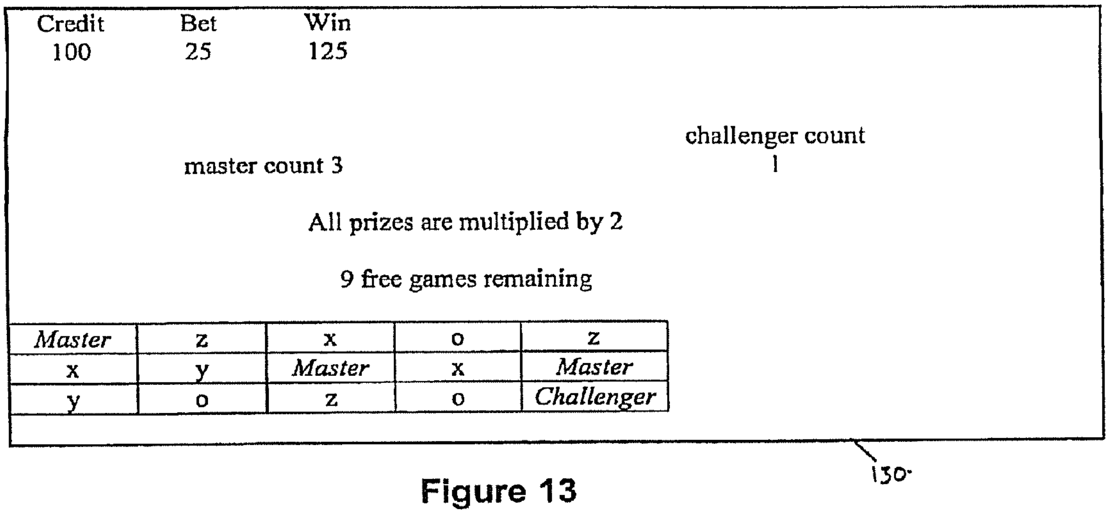
FIG. 13 shows a diagrammatic representation of a screen display at the end of a free game following the base game of FIG. 12.
Figure 14:
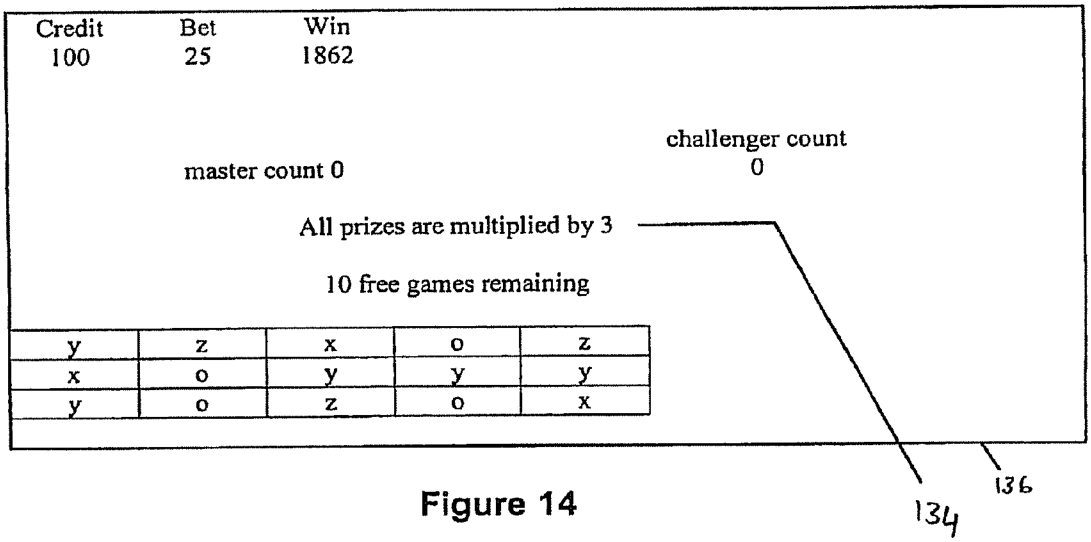
FIG. 14 shows a diagrammatic representation of a screen display at the commencement of a second series of free games awarded as part of a bonus.

In FIG. 12, a second embodiment of a challenge or competitive game feature is shown, which is similar to the first embodiment, save that there is no player choice at the start of the feature and the prize is a second free game series instead of a fixed number of credits. A flow diagram of the steps performed by the game controller 101 in accordance with this embodiment is shown in FIG. 17. In FIG. 17 steps that are equivalent to steps in the process shown in FIG. 16 have been given the same reference numerals as those used in FIG. 16. Accordingly, these steps are not described further.

A display screen 124 of a base game having at least three scatter symbols 126 triggers the feature. A series of ten free games is then awarded, during which all standard wins are doubled (step 128), with all occurrences of the master and challenger symbols being accumulated on the relevant counters at the top of the screen. The first free game may give the result indicated in the screen display 130 of FIG. 13. In the case where the player is not given an opportunity to select the master or challenger, the machine may automatically select one symbol (e.g., the matador) as being the master and the other (the bull) as being the challenger. Alternatively, a fixed master symbol (i.e. matador) may be provided.

Once the first series of free games is complete, including all of the triggers, there are three possible scenarios. First, if the master counter is higher than the challenger counter, then ten more free games are awarded, as is shown at step 132 in FIG. 17. Before these free games commence, the counters are reset to zero so that they can count again for the new free game series. For the subsequent series of free games the prizes are multiplied by three instead of two, as is displayed at 134 in FIG. 14, which shows a screen display 136 at the commencement of the second series of free games. For as long as the master counter is higher than the challenger counter at the end of any free game series, the prize multiplier is set to three. Alternatively, it may be incremented by one after each winning round.

As is the case with the previous game, in the event of the challenger counter is higher than the master counter at the end of a series of free games, then the feature ends. In the event that the challenger counter equals the master counter, a tie-breaker occurs in the same manner as the previous embodiment via a coin spin animation. Alternatively, the default logic could dictate that a draw effectively equates to a loss, in that the master counter has to exceed the challenger counter in order for the player to win the bonus. As a further alternative, the tie breaker could be resolved by playing one or more additional 'sudden death' free games. For example, if game 11 yields one matador and one bull, game 12 is commenced, which yields one matador and zero bulls, so that the matador is the winner.

In a further alternative, a jackpot prize may be awarded if the master counter exceeds the challenger counter for a predetermined number, for example three, series of free games. In this embodiment, the game controller could maintain in memory 103 a count of the number of free games triggered and award a jackpot prize at the end of the third series of free games if the master counter exceeded the challenger counter in the third series. After the jackpot has been awarded, the feature game process may end and the player returned to the base game, awaiting the spinning up of another trigger condition. In this embodiment, the counters between each series of free games may optionally not be reset, resulting in an increased probability of award of each subsequent free game after the first free game series has been successful.

In yet a further embodiment, a range of successive challengers may be provided to defeat the master. For example, during the first free game series, one of the lowest value symbols, and thus one of the most frequently occurring picture symbols may be the winning symbol, or master, represented by the player, and the challenger symbol may be, say, the fourth lowest value symbol, corresponding to the fourth most common symbol. The feature plays in the manner described above except that if the master wins for the second series of free games, the third lowest picture symbol will be the challenger. If a player wins for the third series of free games, the second lowest/most frequent picture symbol will be the challenger. This gives the effect of the master having to defeat more and more powerful challengers as the feature progresses and the challengers become progressively more frequently occurring symbols.

Figure 15:
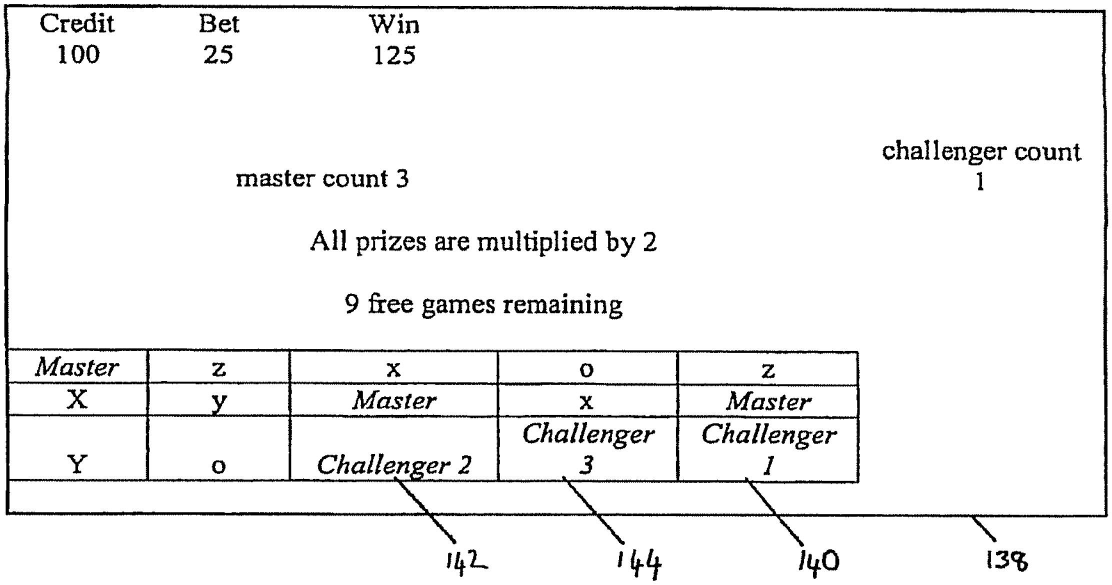
FIG. 15 shows a diagrammatic representation of a screen display of a free game forming part of a third embodiment of a game of the invention.

In FIG. 15, an example of a display screen 130 is shown in which challengers 1, 2 and 3 indicated at 140, 142 and 144 are respectively shown. If at the end of the free game series the master counter is higher than the challenger counter then another free game series commences in which case more frequently occurring challenger 2 replaces challenger 1 to be the relevant challenger. An advantage of using progressively more frequently occurring symbols in respect of particular reel strips for each free game series, is that this avoids having to change the reel strips for each free game series to preserve return-to-player percentages, as it becomes less likely that the master counter will exceed the challenger counter for each free game series as the frequency of the challenger counter increases up to the point where it may become the most common symbol on the reels. However, changing the reel strips represents an alternative, but less preferred method of performing the present invention.

It will be appreciated that various combinations of the embodiments described may be adopted and that further alternatives may be provided. For example, the type of bonus awarded, the type of prize awarded and the selection process for selecting masters and challengers may be varied. In addition, the competition between master and challenger is not confined to a cumulative count. The winner could be the first to reach a particular number. Alternatively, for each free game a point could be awarded in the event of the first symbol out-numbering the second, or vice-versa, with no points being awarded in the event of a draw. The total number of wins over the free game series is then tallied to arrive at the final winner.

In another example, the least frequently occurring symbol of the series of free games could effectively win by virtue of a decrement function, in terms of which the master and challenger counters are initially set, say, to 20, with each occurrence of a master or challenger symbol decrementing the particular counter by one. The winner could then be judged as the party left with the highest number of points, or alternatively, the winner or the loser could be determined as being the first to reach zero.

In a yet further embodiment, the challenge could be based not only on the frequency of occurrence of the symbols, but also on their individual values. For example, every time a master is spun up, 20 units result, and every time a challenger is spun up, 5 units result. One master worth 20 units will thus defeat three challengers worth 15 units. In a value and frequency-based version, a predetermined (say even) or similar odds function could be retained between symbols, at least for a first game series, in that the value×frequency product of one high value low frequency symbol may equal the value×frequency product of another low value high frequency symbol.

Symbols of increasing value can also be used as increasingly powerful challenger symbols in successive series of games, in the same way as symbols of decreasing frequency, in the event of one or more preceding series of games in which a player as master has been successful.

Furthermore, the master and the challenger may be associated with two or more symbols. For example, the master may be associated with the matador symbol 62 and one or more other symbols and the challenger associated with the a bull symbol 64 and one or more other symbols. Preferably, the master and challenger are associated with an equal number of symbols. The winner of a series of free games is still determined in the same way, except the final count is the sum of the multiple symbols associated with the master and the challenger. Other combinations of counters may be used to arrive at a final value if required, but a sum represents the preferred embodiment.

In this embodiment each symbol may be associated with a different counter value. For example if the master was associated with two symbols, one occurring twice as often on the reels as the other, then the one occurring twice as often may contribute to the counter half the amount of that the other symbol contributes. Alternatively, different symbols for the master may have different values, with a similar variation provided in the symbols for the challenger.

Also, a threshold condition may exist before a counter associated with a symbol is incremented (or added to or subtracted from depending on the particular game implementation), in which only multiple occurrences of a symbol are counted in respect of each feature game. Further, for a win to register, there may have to be a predetermined win margin of more than one symbol.

It will be understood that the invention disclosed and defined in this specification extends to all alternative combinations of two or more of the individual features mentioned or evident from the text or drawings. All of these different combinations constitute various alternative aspects of the invention.

Where in the foregoing description reference has been made to specific integers having known equivalents, then those equivalents are hereby incorporated herein as if individually set forth.

Those skilled in the relevant arts will appreciate that modifications and additions may be made to the invention described herein above without departing from the scope of the invention as defined in the appended claims.

The invention claimed is:

1. A gaming system operable to play a game comprising a base game and a feature game, the gaming system comprising:

a game controller configured to control the play of the base game and the feature game;

at least one display in data communication with the game controller and configured to display game play of the base game and the feature game; and a player interface in data communication with the game controller and configured to enable the player to control at least some aspect of game play of the game; and wherein the game controller is configured to control play of the feature game so that:

a) the feature game comprises at least one series of game events wherein in each of said game events, a plurality of symbols from at least one predetermined symbol set that includes (i) a number of first symbols, (ii) a number of second symbols, and (iii) a number of third symbols, are randomly selected and displayed on the at least one display, and wherein said number of third symbols in said at least one predetermined symbol set is greater than said number of second symbols;

b) the feature game awards a bonus dependent on an outcome of one of the at least one series of game events; and wherein during play of the feature game, the game controller is configured to monitor the number of occurrences of the first symbol and the number of occurrences of the second symbol in a first of the at least one series of game events and to evaluate the number of occurrences of the first symbol and the number of occurrences of the second symbols, wherein the outcome of the at least one series of game events is dependent on the evaluation of the number of occurrences of the first symbols and of the number of occurrences of the second symbols, and wherein the outcome involves determining one of said first and second symbols to be a winning symbol and determining the other of said first and second symbols to be a losing symbol based on said evaluation of occurrences, and wherein the game controller is further configured to monitor the number of occurrences of the third symbol in a subsequent second of the at least one series of game events instead of monitoring the number of occurrences of the second symbol in response to the second symbol being a losing symbol in the first of the at least one series of game events, and wherein the bonus is awarded if the first symbol is evaluated to be a winning symbol in said outcome of the subsequent second of the at least one series of game events.

2. The gaming system of claim 1, wherein the symbols defined for each of the reels of the spinning reel game are the same for both the base game and the feature game.

3. The gaming system of claim 1, wherein said player interface is configured to allow a player of the gaming system to determine said at least one predetermined symbol set.

4. The gaming system of claim 1, wherein the feature game is capable of ending in a draw condition and wherein in the event of the draw condition arising, the bonus is awarded dependent on a further outcome determined by a random number generator.

5. The gaming system of claim 4, wherein the further outcome is determined based on the number of occurrences of the first symbols and the number of occurrences of the second symbols in at least one game event.

6. The gaming system of claim 1, wherein the feature game is capable of ending in a draw condition and wherein in the event of the draw condition arising, the bonus is not awarded.

7. The gaming system of claim 1, wherein the bonus is one of:

a) a value determined and displayed at the commencement of the game feature;

b) a linked or standalone progressive amount; and c) a further series of game events.

8. The gaming system of claim 1, wherein during the at least one series of game events, the gaming system awards a prize on the occurrence of at least one predetermined event, and wherein the bonus is at least one further series of game events.

9. The gaming system of claim 1, wherein during the at least one series of game events, the gaming system awards a prize on the occurrence of at least one predetermined event, and wherein the bonus is a multiplier of the prize.

10. The gaming system of claim 8, wherein a further series of game events is awardable from each said series or further series of game events as a bonus, and upon the award of a predetermined number of consecutive bonuses, the game controller awards a prize and ends the feature game.

11. The gaming system of claim 1, wherein the game controller is operable to incorporate one or more additional symbols from said at least one predetermined symbol set into the feature as one of said at least first and second symbols.

12. The gaming system of claim 11, wherein said one or more additional symbols are used as one of said at least first and second symbols only in a second series of game events subsequent to a first series of game events in said at least one series of game events.

13. The gaming system of claim 12, wherein at least one of said one or more additional symbols occur with a different frequency from the at least first and second symbols so as to result in it being less likely that a player will be awarded a bonus in the second series of game events relative to the first series of game events.

14. The gaming system of claim 13, wherein the at least first and second symbols represent opponents in a competition to win the bonus, the result of the competition being the outcome of the series of game events.

15. The gaming system of claim 1, wherein for the at least one series of game events, the at least first and second symbols comprise at least four symbols, and wherein the outcome is dependent on the sum of the number of occurrences of at least two groups of symbols within the at least four symbols.

16. The gaming system of claim 1, wherein the gaming system is a gaming machine.

17. The gaming system of claim 1, and wherein said base game has a game format, and wherein play of the base game involves the game controller deducting credit from a credit meter dependent on a wager made in the base game, and wherein each game event in the at least one series of game events comprises a game event in the same game format as the base game, and wherein credit from the credit meter is not deducted for play of the at least one series of game events.

18. The gaming system of claim 1, wherein the base game and the feature game have the format of a spinning reel game so that symbols defined for each reel of the spinning reel game define said at least one predetermined symbol set.

19. A computerized method of gaming for use with a gaming system having an electronic game controller, a memory readable by the game controller, at least one display for displaying game images and a user interface to receive selections related to game play made by a player of the gaming system, the method comprising:

a) storing via said electronic game controller in said memory a definition of a predetermined set of symbols separated into a plurality of subsets of symbols;

b) storing via said electronic game controller in said memory a definition of a number of first symbols, a number of second symbols, and a number of third symbols from said predetermined set of symbols, and wherein said number of third symbols in said at least one predetermined symbol set is greater than said number of second symbols;

c) randomly selecting via said electronic game controller, in a series of game events, a plurality of symbols from said predetermined set of symbols and displaying the selected plurality of symbols on the at least one display;

d) determining via said electronic game controller, in said series of game events, the number of times the first symbol occurs and the number of times the second symbol occurs in the selected plurality of symbols;

e) repeating steps c) and d) at least once;

f) dependent on an evaluation of the determination made in steps d) and e) and based on predefined competitive criteria in said series of game events, awarding via said electronic game controller a bonus to the player of the gaming system; and g) determining via said electronic game controller the number of times of the first symbol occurs and the number of times the third symbol occurs in the selected plurality of symbols in a subsequent series of game events, instead of the number of times of the second symbol, in response to the number of times the second symbol occurs being less than the number of times the first symbol occurs.

20. The method of claim 19, wherein a number of occurrences of the first symbols and a number of occurrences of the second symbols result in a draw condition, and wherein if a draw condition arises, the method further comprising selecting one of the first and second symbols based on the output from a random number generator and awarding the bonus only if a predetermined one of the first and second symbols is selected.

21. The method of claim 19, wherein a number of occurrences of the first symbols and a number of occurrences of the second symbols result in a draw condition, and wherein if a draw condition arises the method comprises not awarding the bonus.

22. The method of claim 19, wherein the bonus is selected from the set of:

a) a value determined and displayed at the commencement of the game feature;

b) a linked or standalone progressive amount; and c) at least one further series of game events comprising multiple repetitions of steps c) and d).

23. The method of claim 22, wherein the bonus is a game in which at least one further series of game events comprising multiple repetitions of steps c) and d) and dependent on said evaluation of the determination made in steps d) and e), a second bonus is awarded.

24. The method of claim 23, wherein the second bonus is a game in which at least one still further series of game events comprising multiple repetitions of steps c) and d) and dependent on the number of occurrences of the first symbols and the number of occurrences of the second symbols, a third bonus is awarded.

25. The method of claim 24, and wherein the second bonus is a type of bonus, and wherein the third bonus is either an amount of credits or a bonus of the same type as the second bonus.

26. The method of claim 23, wherein the number of occurrences of the first symbols and the number of occurrences of the second symbols are reset between play of the bonuses.

27. The method of claim 26, further comprising decreasing the probability of the award of each subsequent bonus.

28. The method of claim 19, when implemented on a gaming system having a base game, wherein the method is invoked only after a predetermined trigger event occurs that is related to play of the base game.

* * * * *